United States Patent
Ko et al.

(10) Patent No.: US 6,639,641 B1
(45) Date of Patent: Oct. 28, 2003

(54) MULTI-DOMAIN LIQUID CRYSTAL DISPLAY DEVICE

(75) Inventors: Doo Hyun Ko, Kumi-shi (KR); Joun Ho Lee, Daeku-kwangyokshi (KR); Jeong Ki Park, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/716,229

(22) Filed: Nov. 21, 2000

(30) Foreign Application Priority Data

Nov. 25, 1999 (KR) .............................................. 99-52824
Dec. 28, 1999 (KR) .............................................. 99-63312

(51) Int. Cl.$^7$ .......................................... G02F 1/1343
(52) U.S. Cl. ...................................... 349/143; 349/142
(58) Field of Search ................................ 349/129, 143, 349/142

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/366 |
| 4,937,566 A | 6/1990 | Clerc | 340/784 |
| 4,978,203 A | 12/1990 | Yamazaki et al. | 350/339 R |
| 5,574,582 A | 11/1996 | Takeda et al. | 359/59 |
| 5,608,556 A * | 3/1997 | Koma | 349/143 |
| 5,668,650 A | 9/1997 | Mori et al. | 349/42 |
| 5,737,051 A | 4/1998 | Kondo et al. | 349/141 |
| 5,777,701 A | 7/1998 | Zhang | 349/44 |
| 6,100,953 A * | 8/2000 | Kim et al. | 349/129 |
| 6,300,996 B1 * | 10/2001 | Matsuyama et al. | 349/144 |

FOREIGN PATENT DOCUMENTS

| | | |
|---|---|---|
| EP | 0 679 921 A1 * | 2/1995 |
| EP | 0 752 611 | 1/1997 |
| EP | 0 814 142 | 12/1997 |
| EP | 0 854 377 | 7/1998 |
| GB | 2 296 810 | 7/1996 |
| GB | 2 321 718 | 8/1998 |
| GB | 2 337 843 | 1/1999 |
| GB | 2 347 779 * | 9/2000 |
| JP | 05-297412 | 11/1993 |
| JP | 09-197420 | 7/1997 |
| JP | 09-230387 | 9/1997 |

* cited by examiner

Primary Examiner—Tarifur Chowdhury
Assistant Examiner—Dung Nguyen
(74) Attorney, Agent, or Firm—McKenna Long & Aldridge LLP

(57) ABSTRACT

A multi-domain liquid crystal display device includes first and second substrates facing each other; a plurality of gate bus lines arranged in a first direction on the first substrate and a plurality of data bus lines arranged in a second direction on the first substrate to define a plurality of pixel region; a thin film transistor at a crossing area of the gate and data bus lines; a common-auxiliary electrode at outside and inside of the pixel region; a pixel electrode in the each pixel region, the pixel electrode connecting the thin film transistor; at least one series of windows inducing electric field in a plurality of specified directions in the pixel electrode; an alignment layer on at least one substrate between the first and second substrates; and a liquid crystal layer between the first and second substrates.

14 Claims, 32 Drawing Sheets

$\theta = 45°$ $\theta = 135°$ $\theta = 45°$ $\theta = 135°$

θ = 45°

θ = 135°

θ = 45°

θ = 135°

$\theta = 45°$ $\theta = 135°$

1

MULTI-DOMAIN LIQUID CRYSTAL DISPLAY DEVICE

REFERENCE TO RELATED APPLICATIONS

This application also claims the benefit of Korean Patent Application No. 1999-52824 filed on Nov. 25, 1999 and Korean Patent Application No. 1999-63312 filed on Dec. 28, 1999 which are hereby incorporated by reference for all purposes as if fully set forth herein.

BACKGROUND OF THE INVENTION

1. Field of the Invention

The present invention relates to a liquid crystal display device (LCD), and more particularly, to a multi-domain liquid crystal display device having common-auxiliary electrodes, dielectric frame for distorting electric field and window inducing electric field.

2. Description of the Related Art

Recently, a LCD has been proposed that the liquid crystal is not aligned and the liquid crystal is driven by side electrodes insulated from pixel electrodes. FIG. 1 is a sectional view of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions. A thin film transistor (TFT) applies image signals delivered from the data bus line to a pixel electrode 13 on a passivation layer 37. The TFT is formed on each pixel region and comprises a gate electrode, a gate insulator, a semiconductor layer, a source electrode, and a drain electrode, etc.

Pixel electrode 13 is formed on the gate insulator, thereon passivation layer 37 is formed over the whole first substrate, and side electrode 21 is formed surrounding the pixel electrode 13 and a part of pixel electrode 13 overlaps side electrode 21. Alternatively, pixel electrode 13 is formed on the gate insulator, and passivation layer 37 is formed over the whole first substrate.

On second substrate, a light shielding layer 25 is formed to shield any light leakage from gate and data bus lines, and the TFT, a color filter layer 23 is formed on the light shielding layer 25, an overcoat layer is formed on the color filter layer, a common electrode 17 is formed to have open area 27 on the overcoat layer, and a liquid crystal layer is formed between the first and second substrates.

The common electrode 17 is formed and applies electric field to a liquid crystal layer together with pixel electrode 13. Side electrode 21 and open area (slit) 27 distort the electric field applied to the liquid crystal layer.

Then, in a unit pixel liquid crystal molecules are driven variously. This means that when voltage is applied to the LCD, dielectric energy due to the distorted electric field arranges the liquid crystal directors in needed or desired positions.

In the LCDs, however, open area 27 in common electrode 17 or pixel electrode 13 is indispensable, and the liquid crystal molecules could be driven more stably when the open area is wider. If the electrodes do not have any open area or the width of the open area is narrow, the electric field distortion needed to divide the pixel region becomes weak. Then, when voltage over a threshold voltage, $V_{th}$, is applied, the time needed to stabilize the liquid crystal directors increases.

At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to a LCD that substantially obviates one or more problems due to limitations and disadvantages of the related art.

An object of the present invention is to provide a multi-domain LCD having high response time characteristics and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a plurality of gate bus lines arranged in a first direction on the first substrate and a plurality of data bus lines arranged in a second direction on the first substrate to define a plurality of pixel region; a thin film transistor at a crossing area of the gate and data bus lines; a common-auxiliary electrode at outside and inside of the pixel region; a pixel electrode in the each pixel region, the pixel electrode connecting the thin film transistor; at least one series of windows inducing electric field in a plurality of specified directions in the pixel electrode; an alignment layer on at least one substrate between the first and second substrates; and a liquid crystal layer between the first and second substrates.

The common-auxiliary electrode has connecting parts which connect to a common-auxiliary electrode in a pixel region neighboring the pixel region in the first direction.

A part of the pixel electrode overlaps the common-auxiliary electrode.

The present multi-domain liquid crystal display device further comprises a dielectric frame for distorting electric field on the second substrate, a first compensation film (uniaxial or biaxial film) on the first or second substrate, and a second compensation film (uniaxial or biaxial film) on the first compensation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE PREFERRED EMBODIMENTS

Hereinafter, the multi-domain liquid crystal display device of the present invention is explained in detail by accompanying the drawings.

Figure 1:
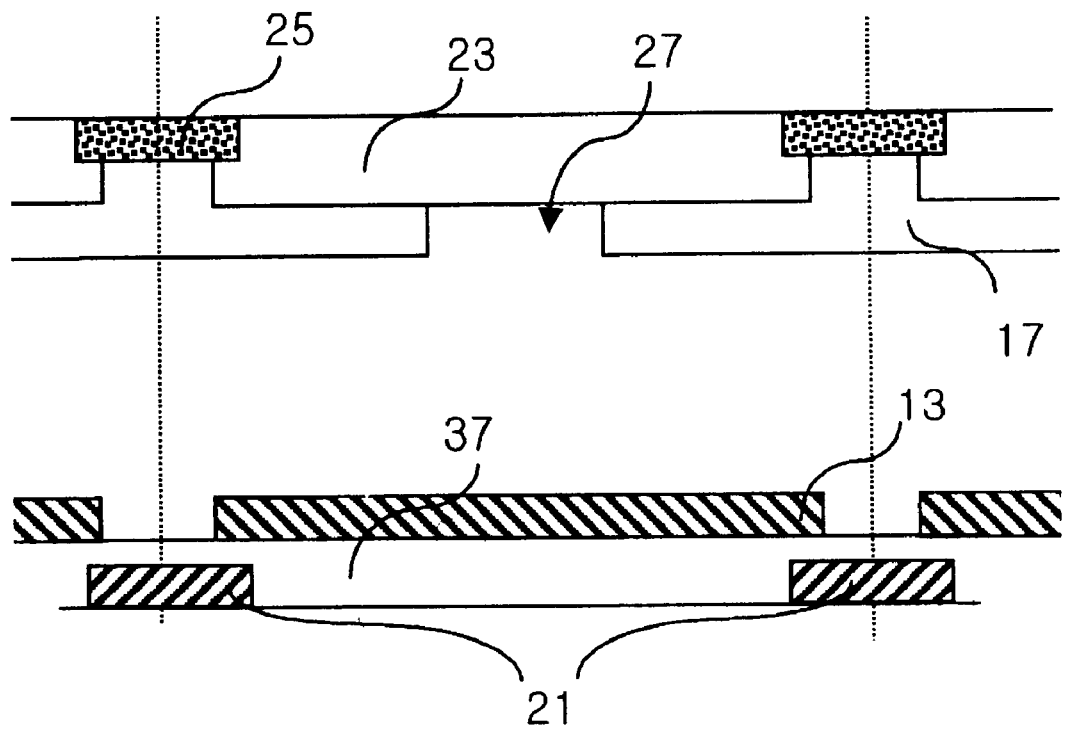
FIG. 1 is a sectional view of the liquid crystal display device in the related art.
Figure 2A:
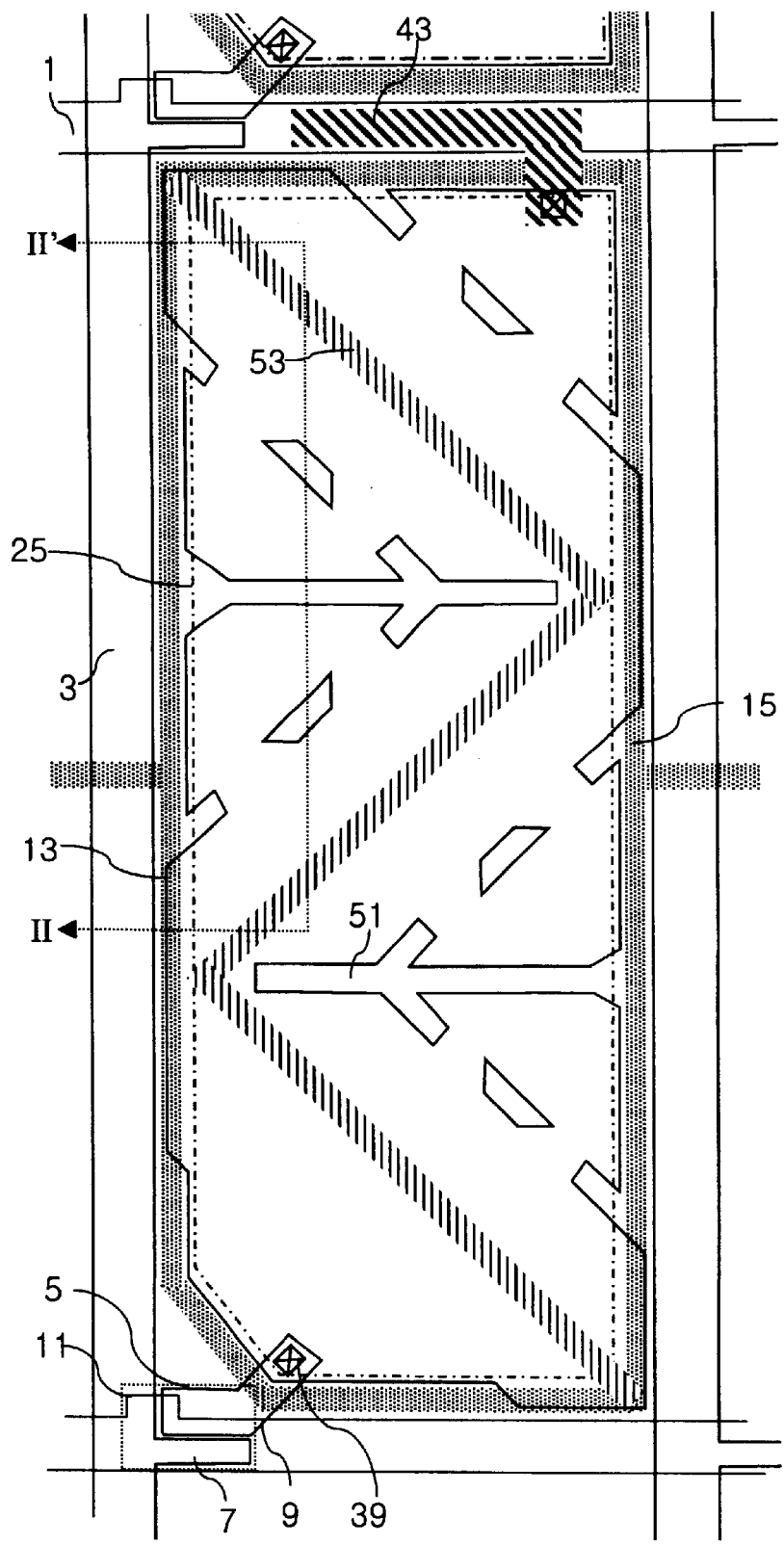
FIGS. 2A and 2C are plan views of the multi-domain liquid crystal display device according to the first embodiment of the present invention and FIGS. 2B and 2D are sectional views taken along the line II–II' of FIG. 2A and the line III–III' of FIG. 2C.
Figure 2B:
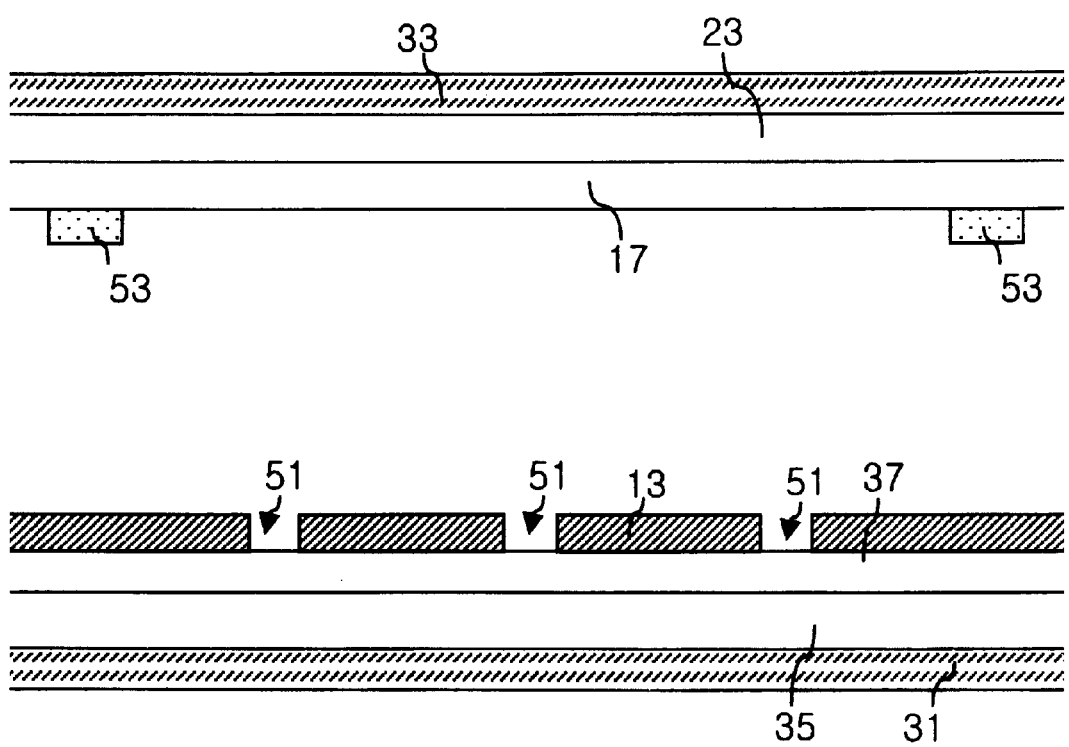
Figure 2C:
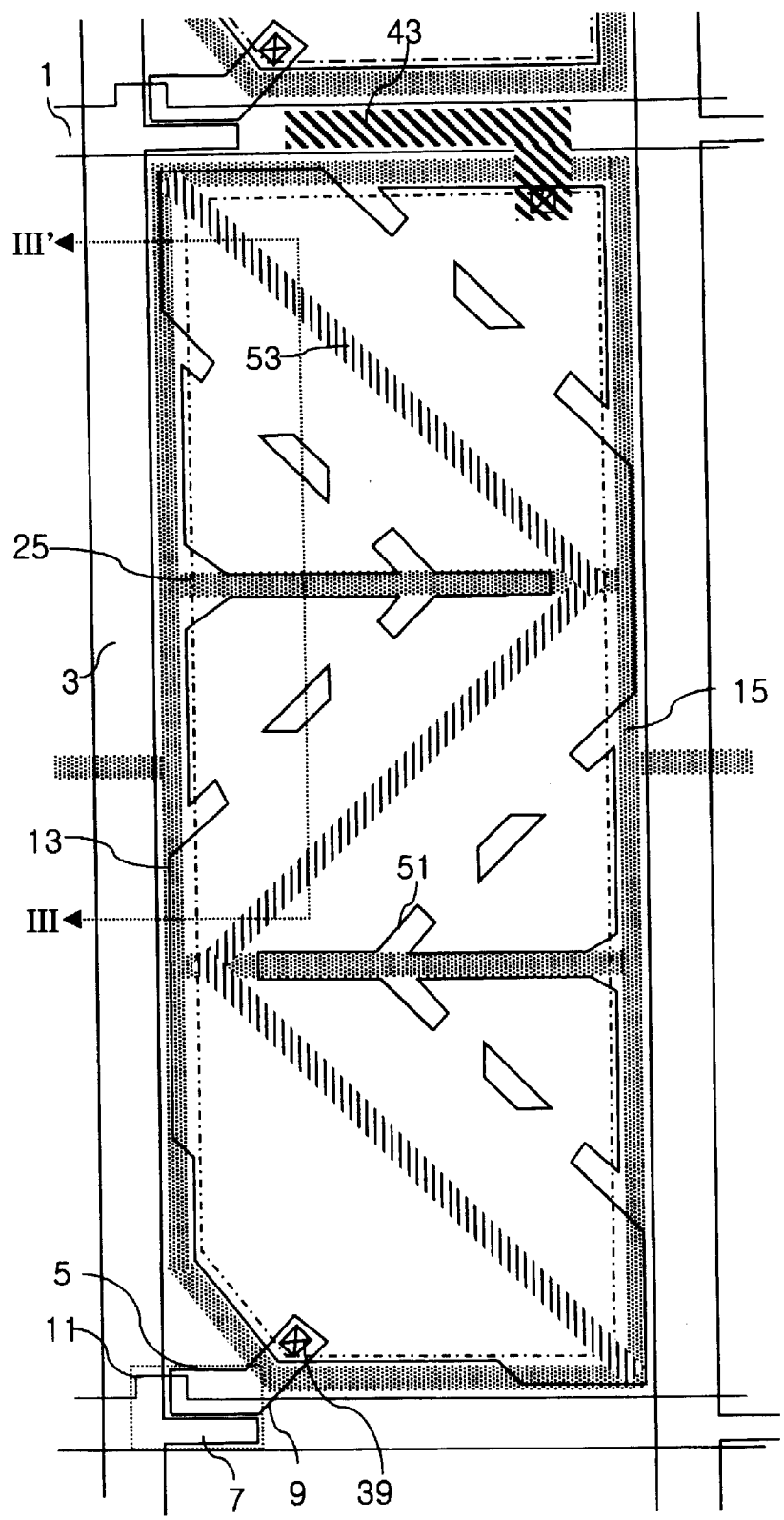
Figure 2D:
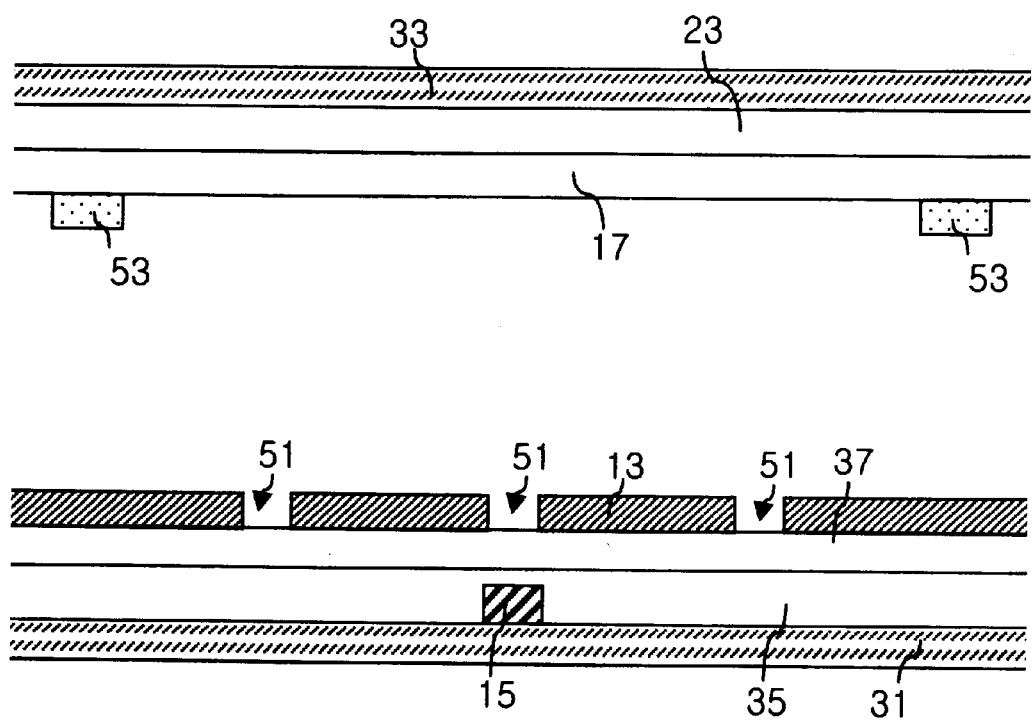
Figure 3A:
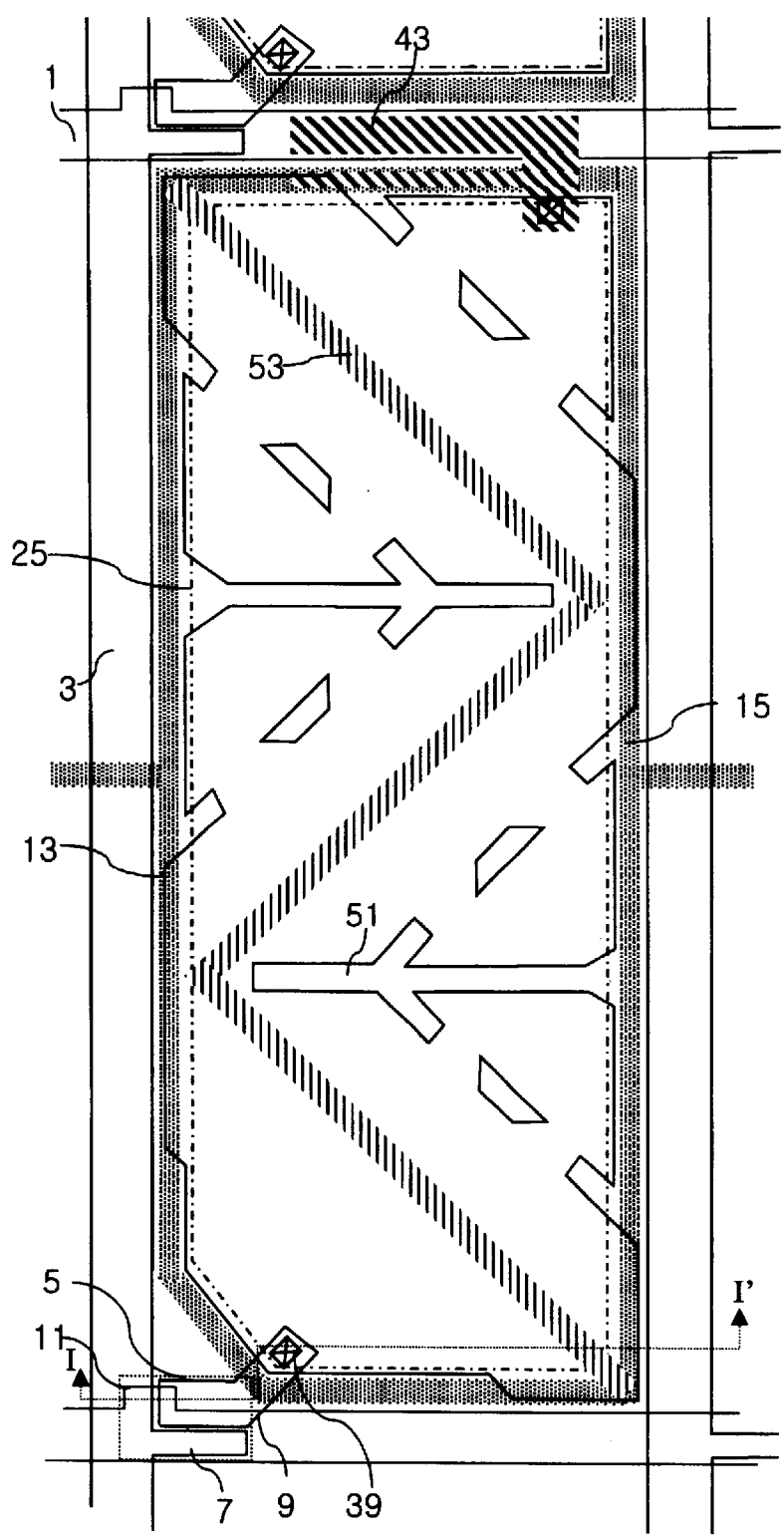
FIGS. 3A and 3B are plan views of the multi-domain liquid crystal display device according to the second embodiment of the present invention.
Figure 3B:
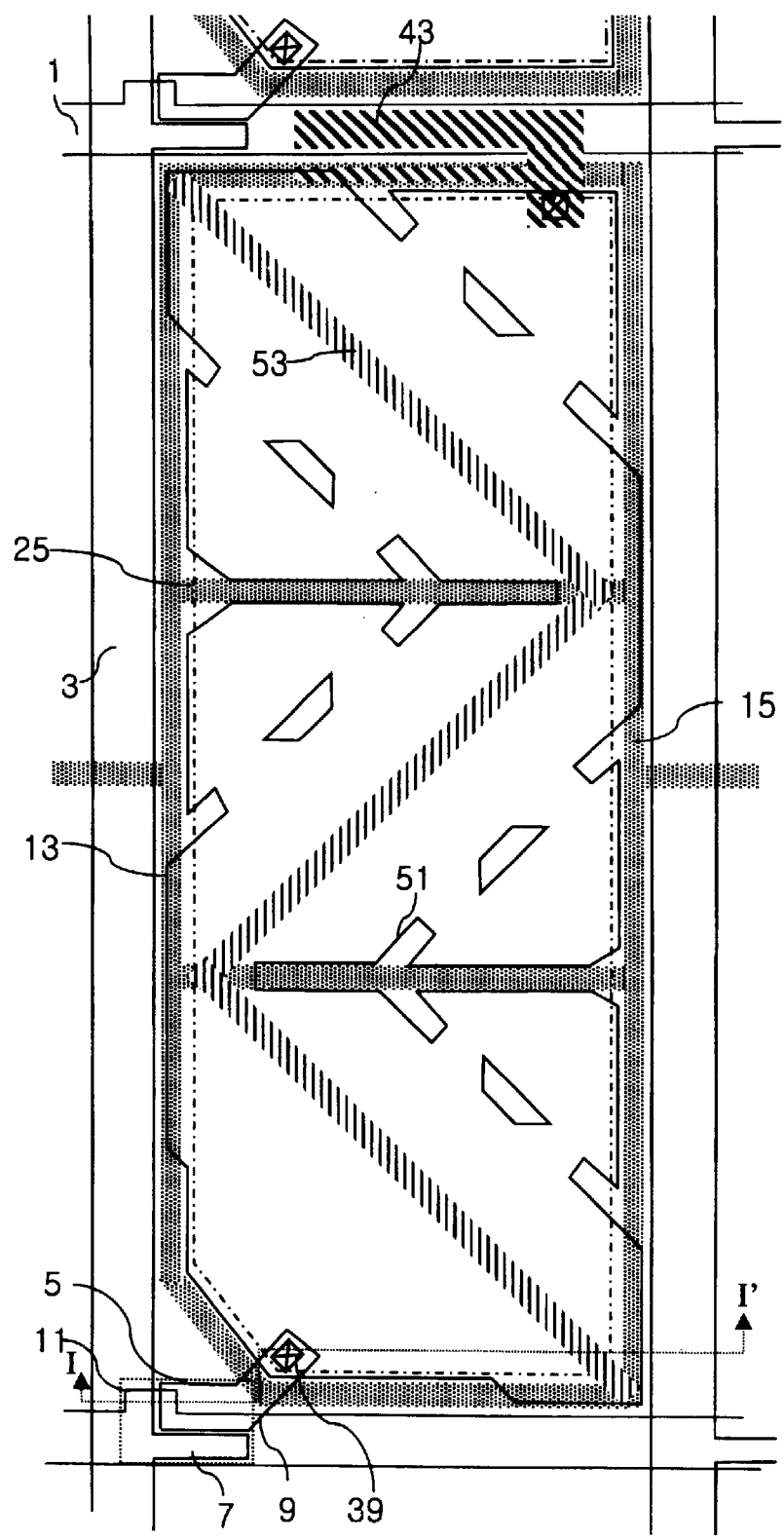
Figure 4A:
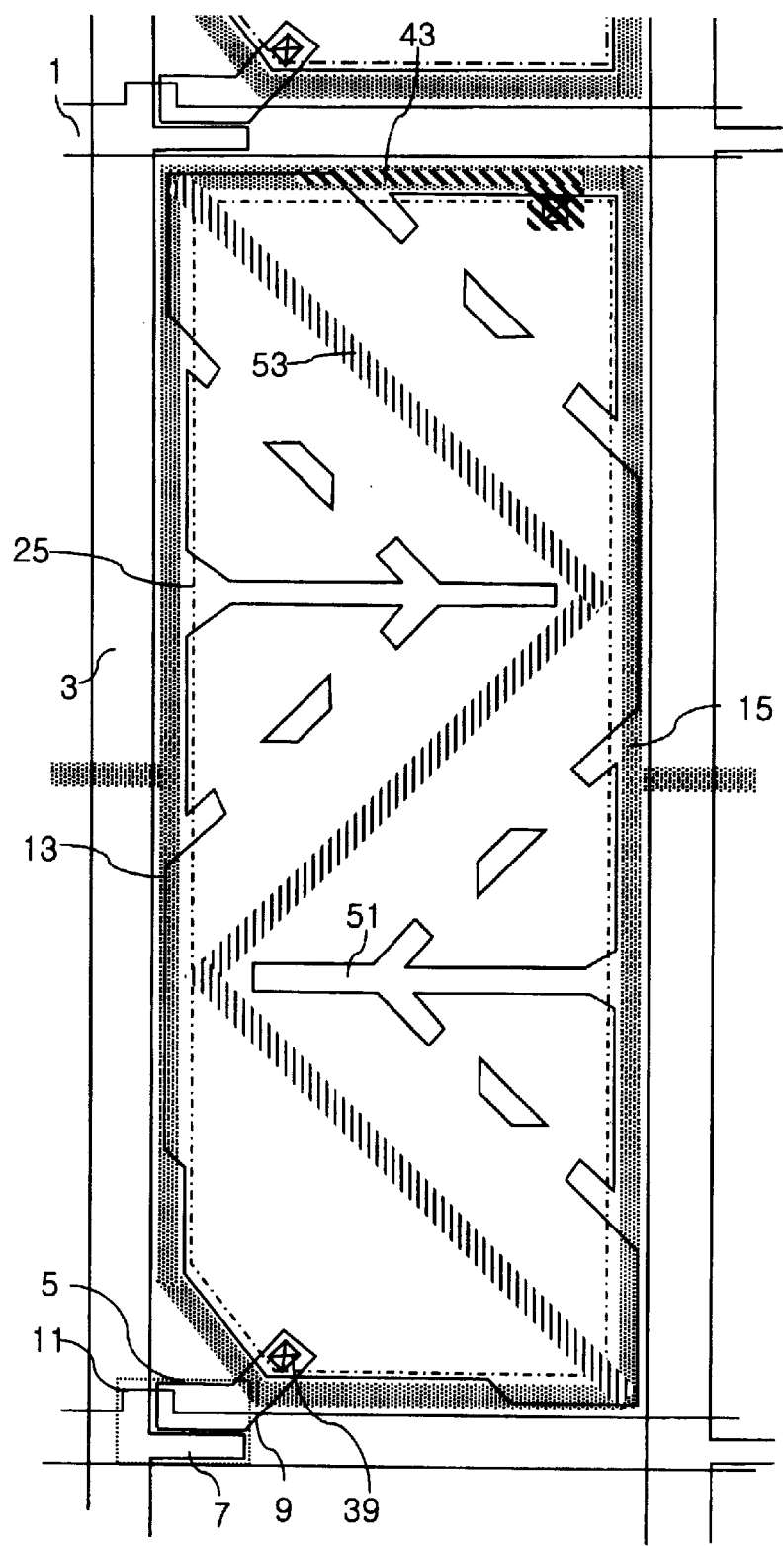
FIGS. 4A and 4B are plan views of the multi-domain liquid crystal display device according to the third embodiment of the present invention.
Figure 4B:
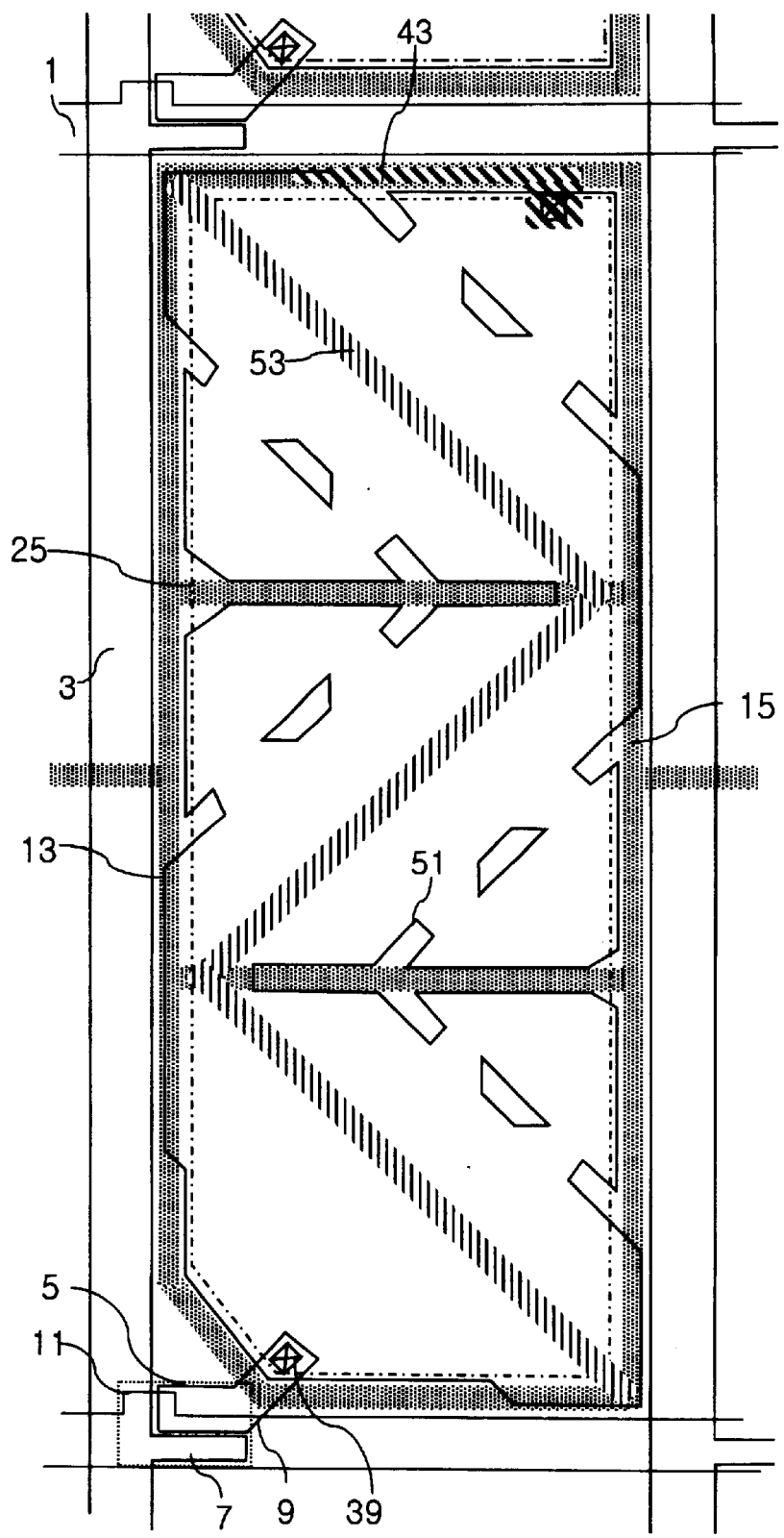
Figure 5A:
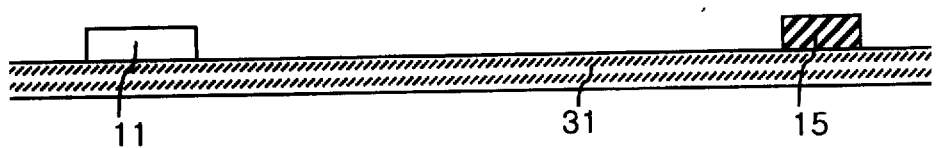
FIGS. 5A to 5E are views showing the forming process of the present multi-domain liquid crystal display device taken along the line I–I' of FIG. 3A.
Figure 5B:
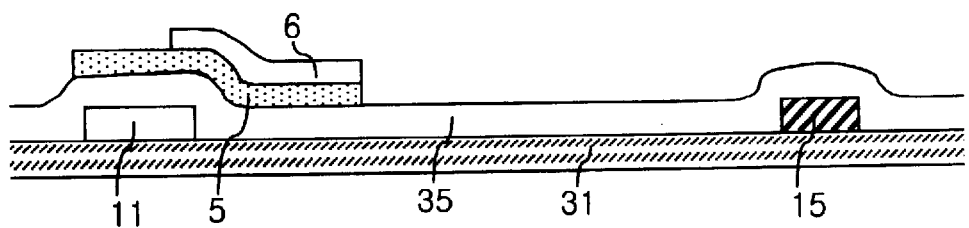
Figure 5C:
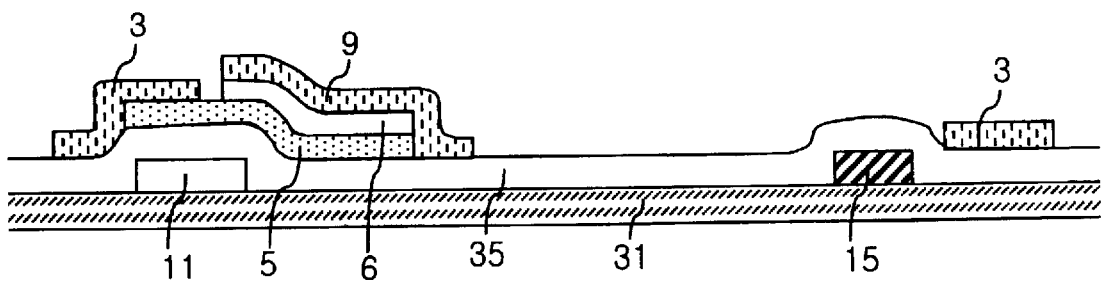
Figure 5D:
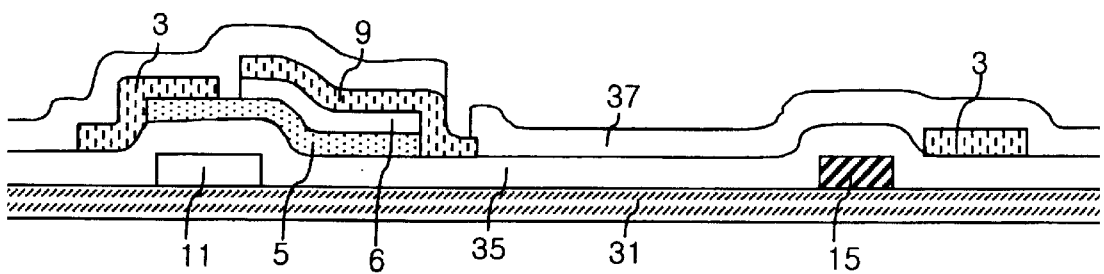
Figure 5E:
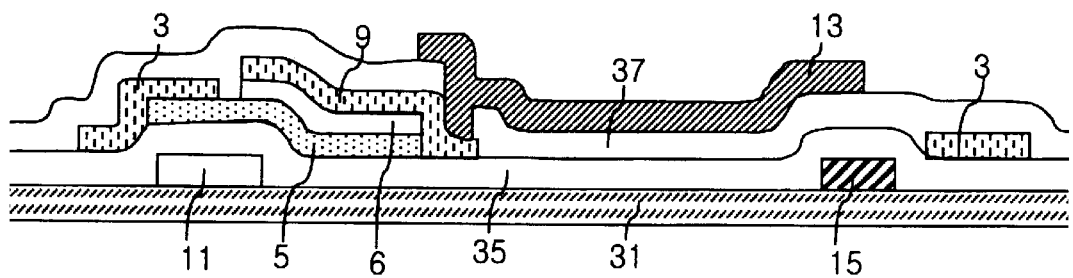
Figure 6A:
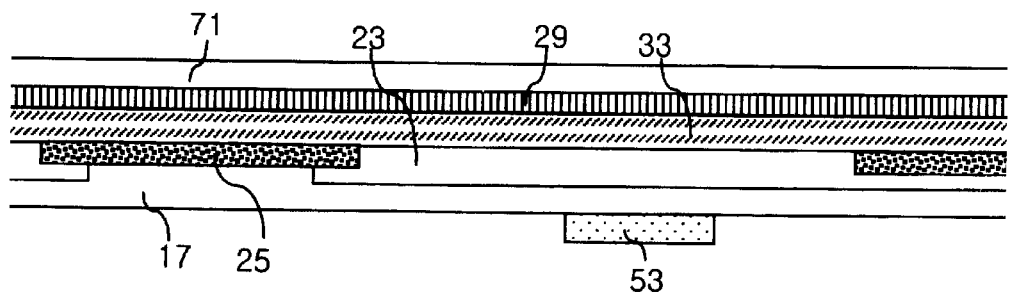
FIGS. 6A to 6D are sectional views taken along the line I–I' of FIG. 3A according to the embodiments of the present invention.
Figure 6A:
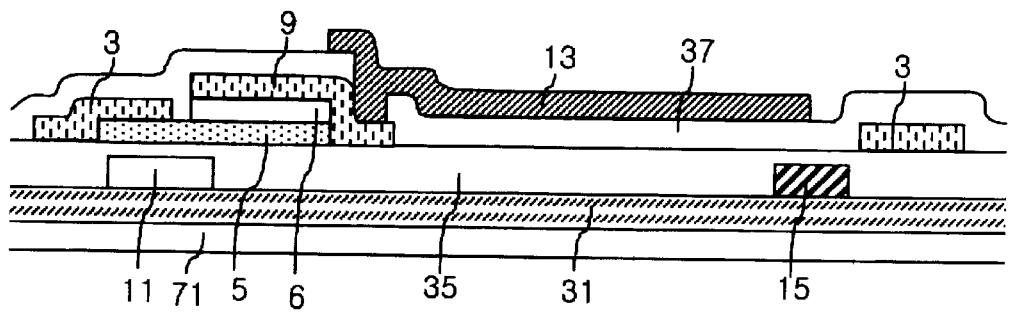
Figure 6B:
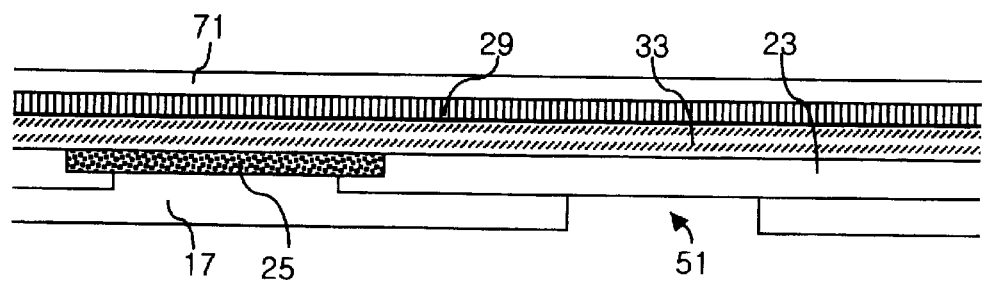
Figure 6B:
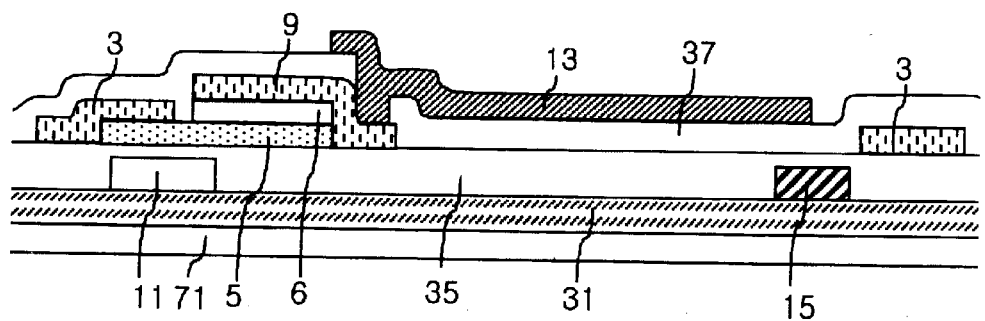
Figure 6C:
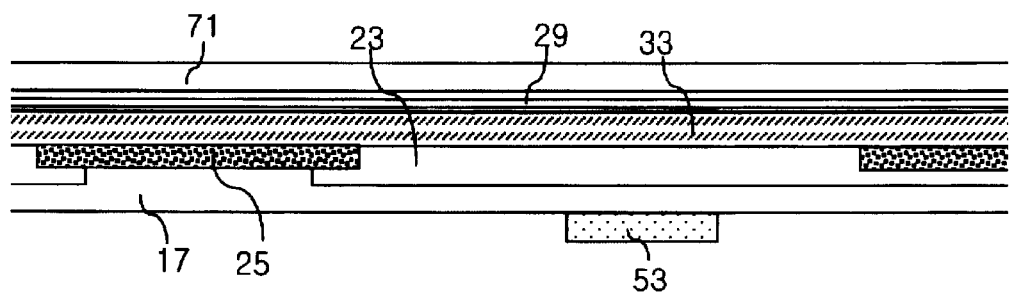
Figure 6C:
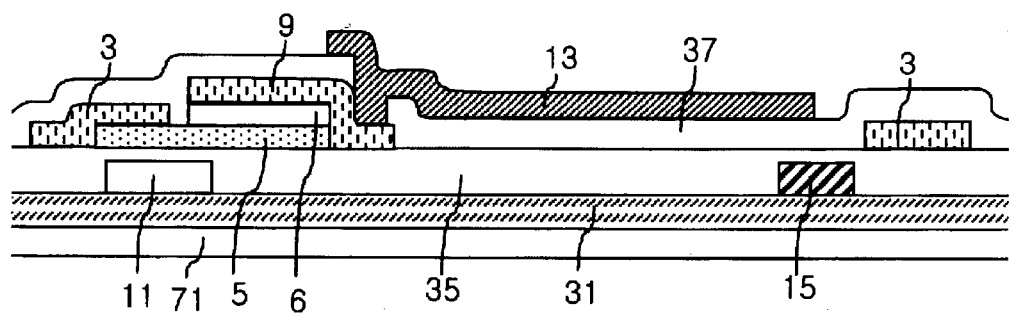
Figure 6D:
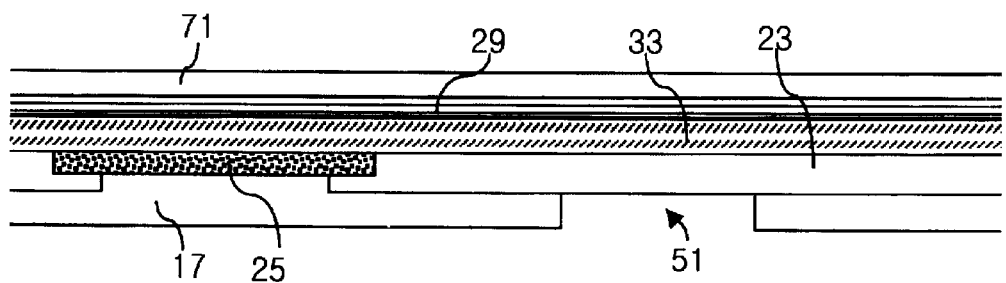
Figure 6D:
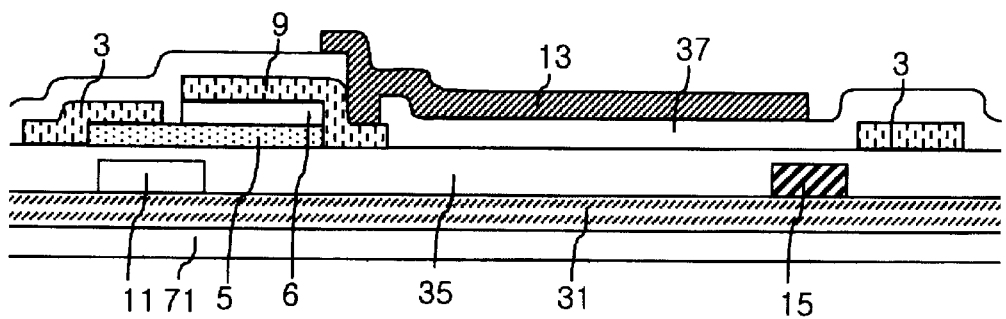
Figure 7A:
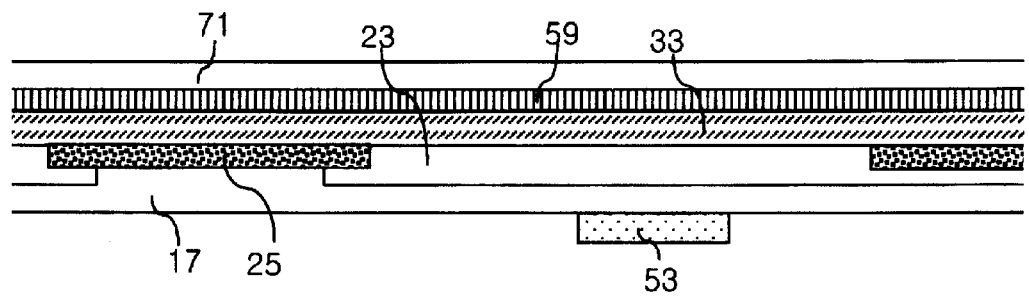
FIGS. 7A to 7H are sectional views taken along the line I–I' of FIG. 3A according to the embodiments of the present invention.
Figure 7A:
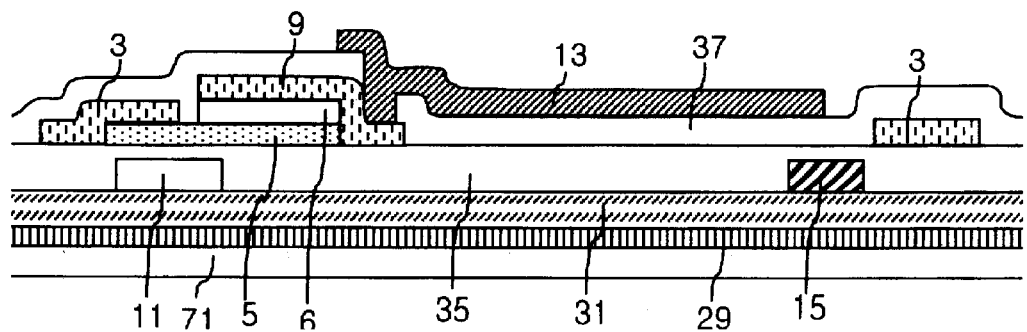
Figure 7B:
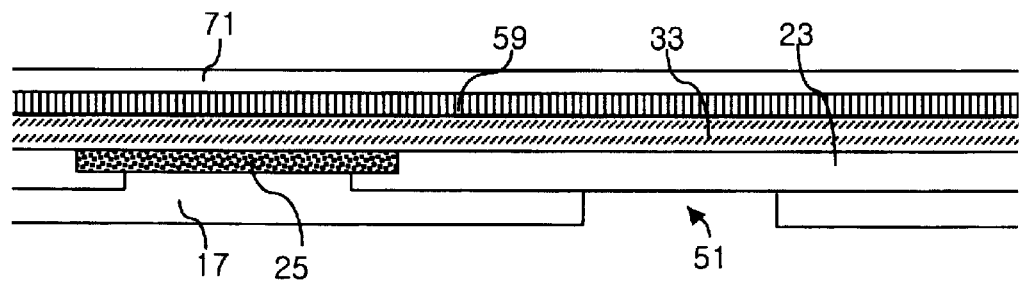
Figure 7B:
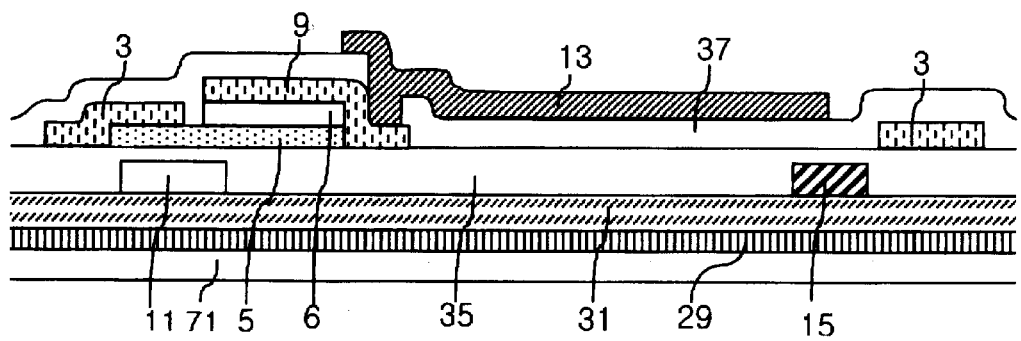
Figure 7C:
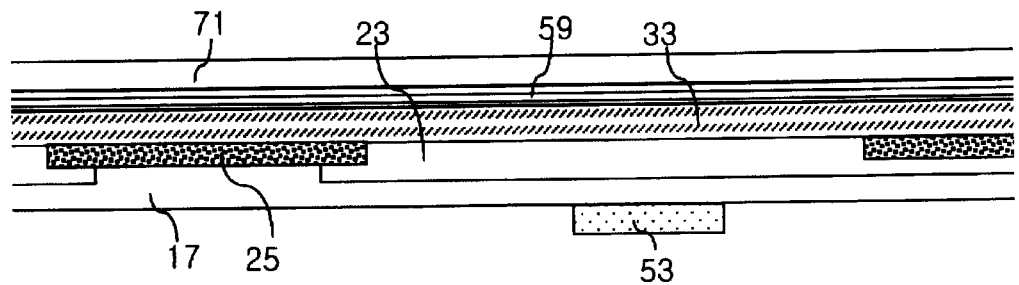
Figure 7C:
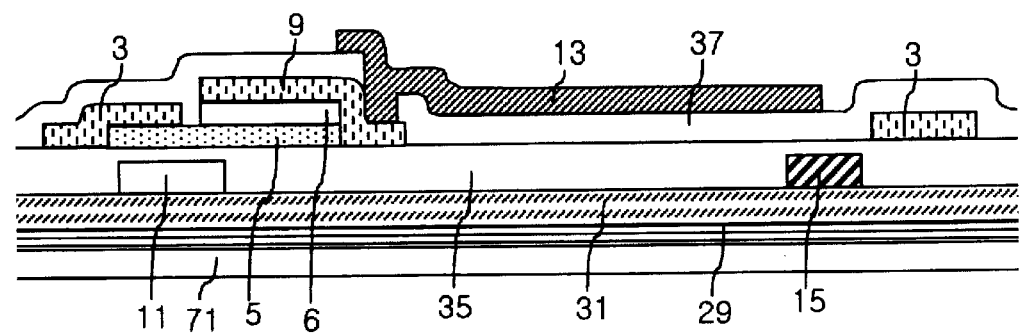
Figure 7D:
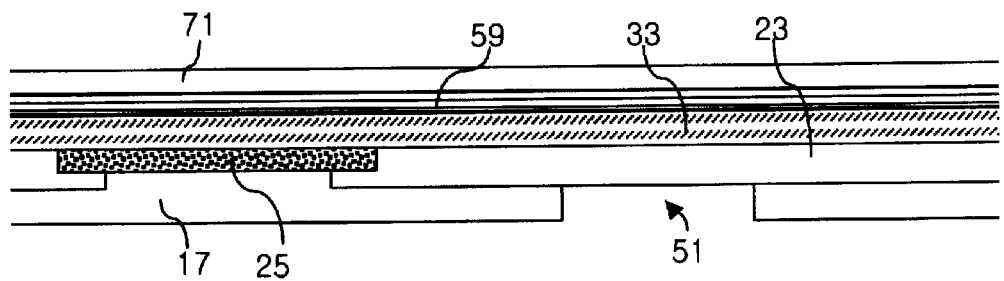
Figure 7D:
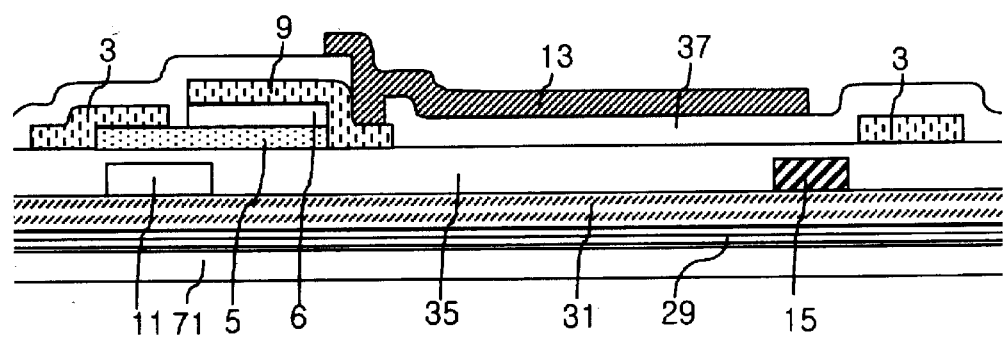
Figure 7E:
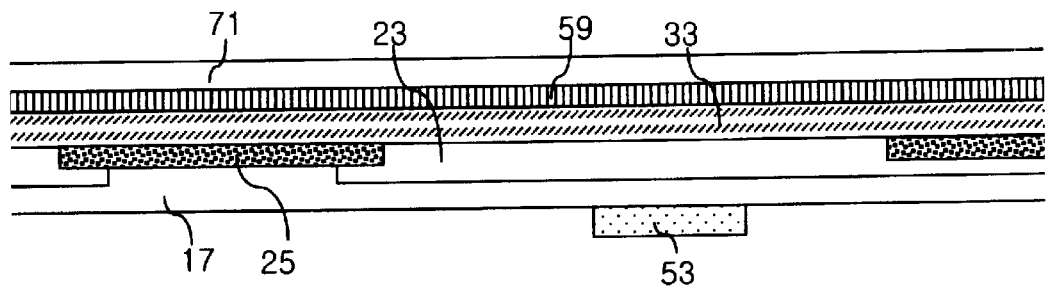
Figure 7E:
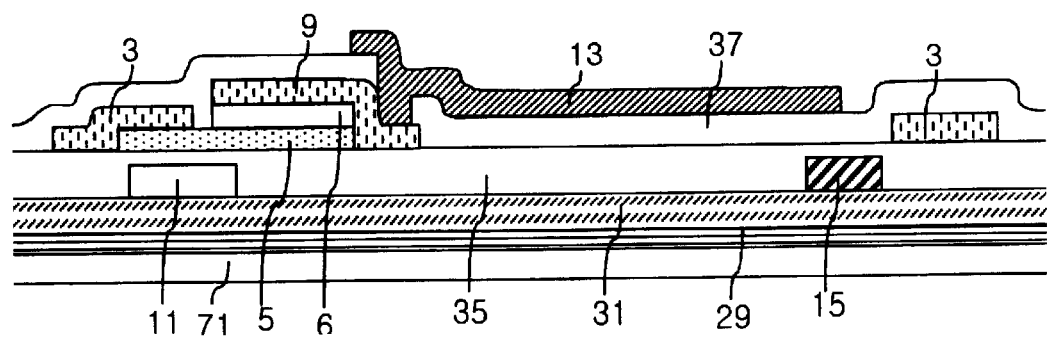
Figure 7F:
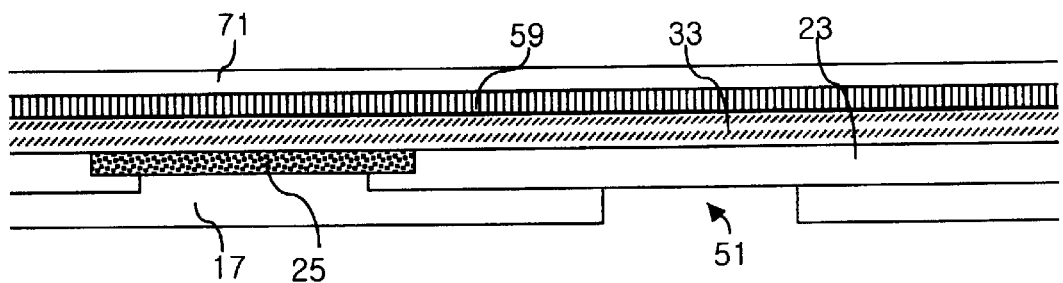
Figure 7F:
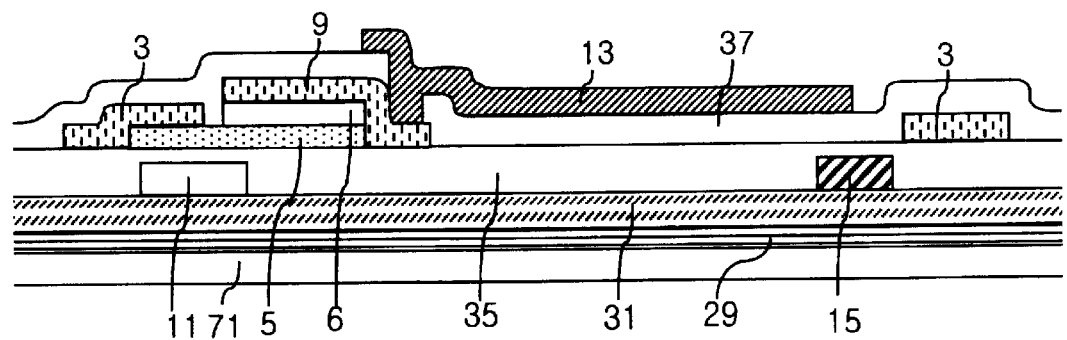
Figure 7G:
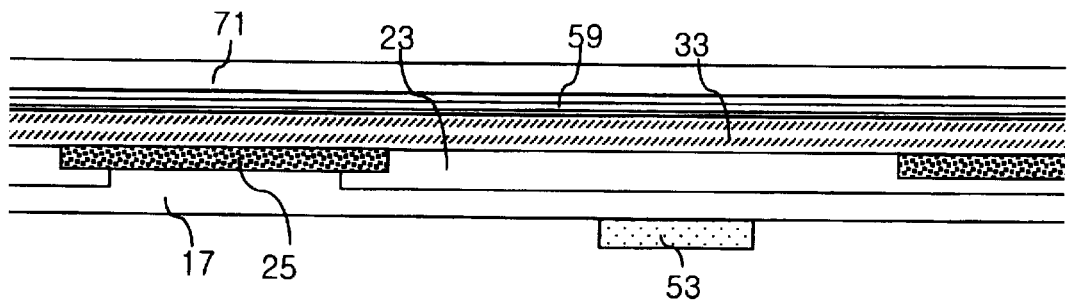
Figure 7G:
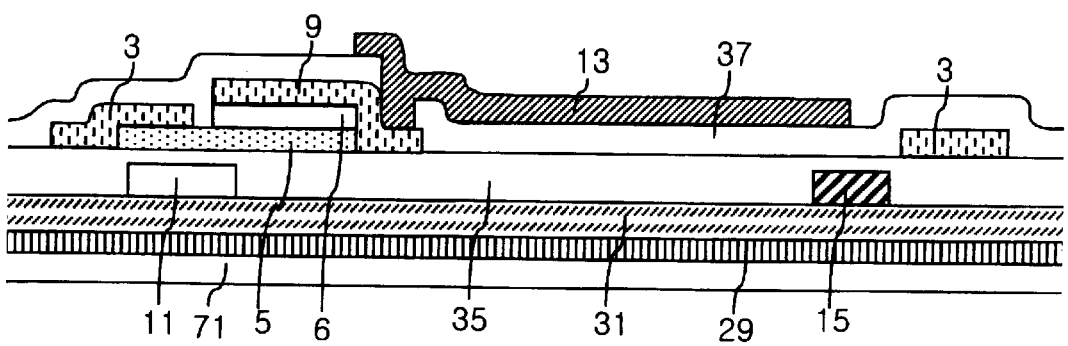
Figure 7H:
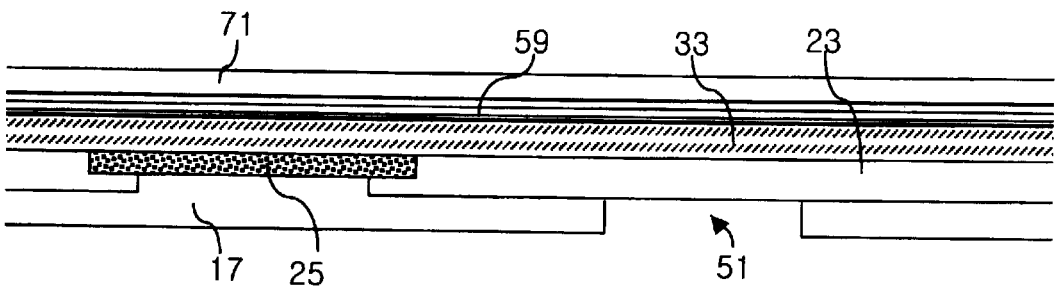
Figure 7H:
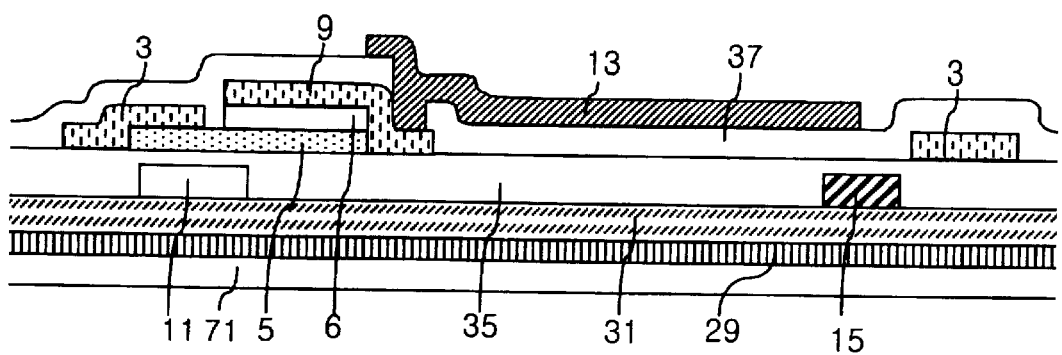
Figure 8A:
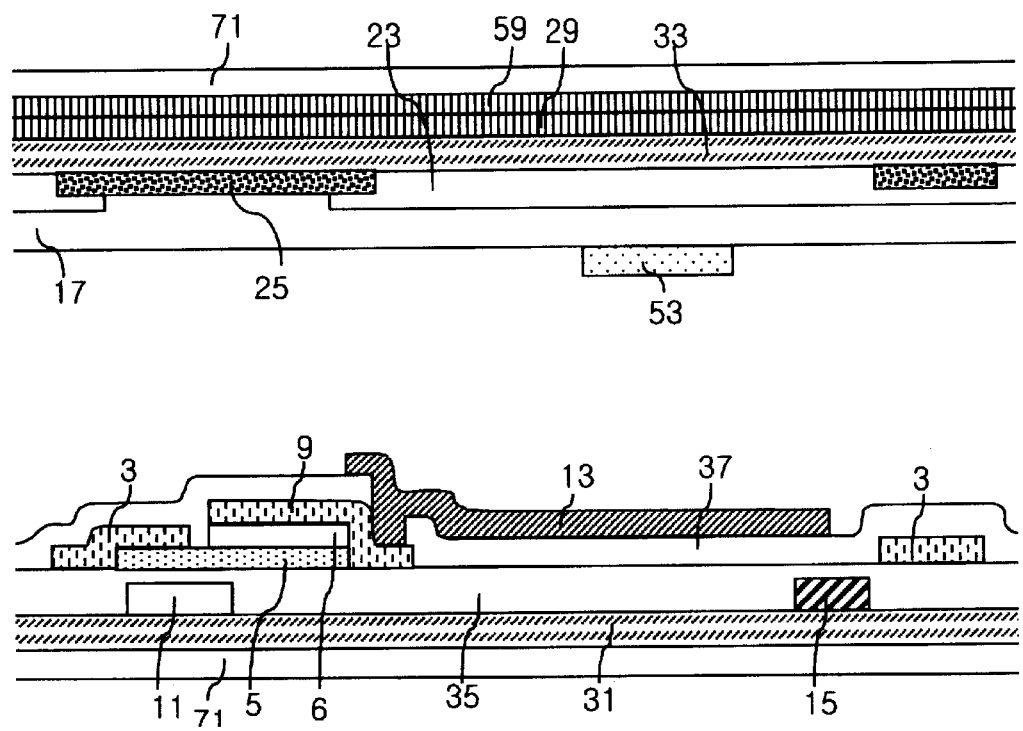
FIGS. 8A to 8D are sectional views taken along the line I–I' of FIG. 3A according to the embodiments of the present invention.
Figure 8B:
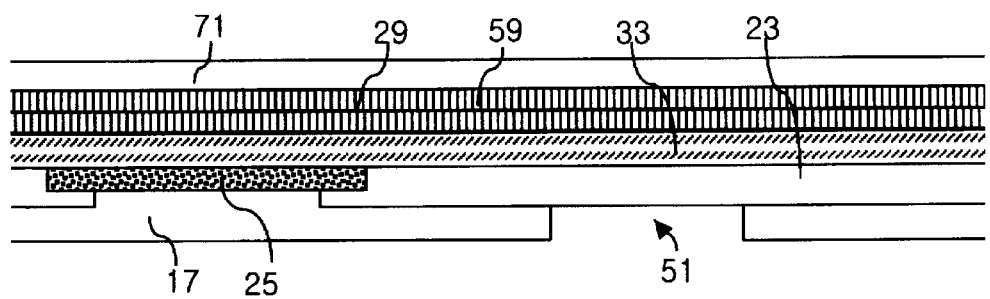
Figure 8B:
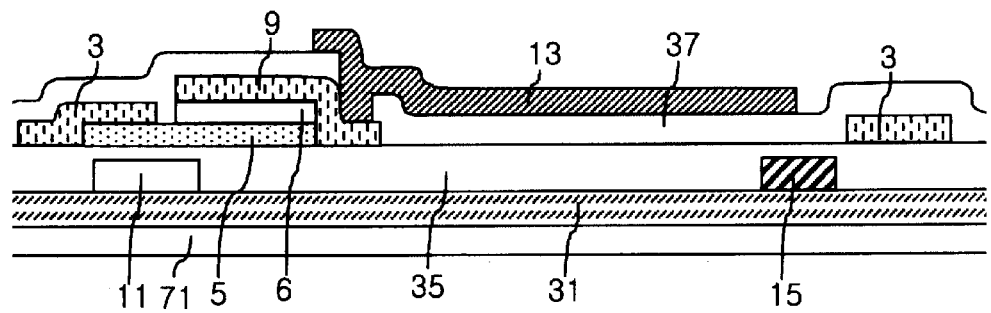
Figure 8C:
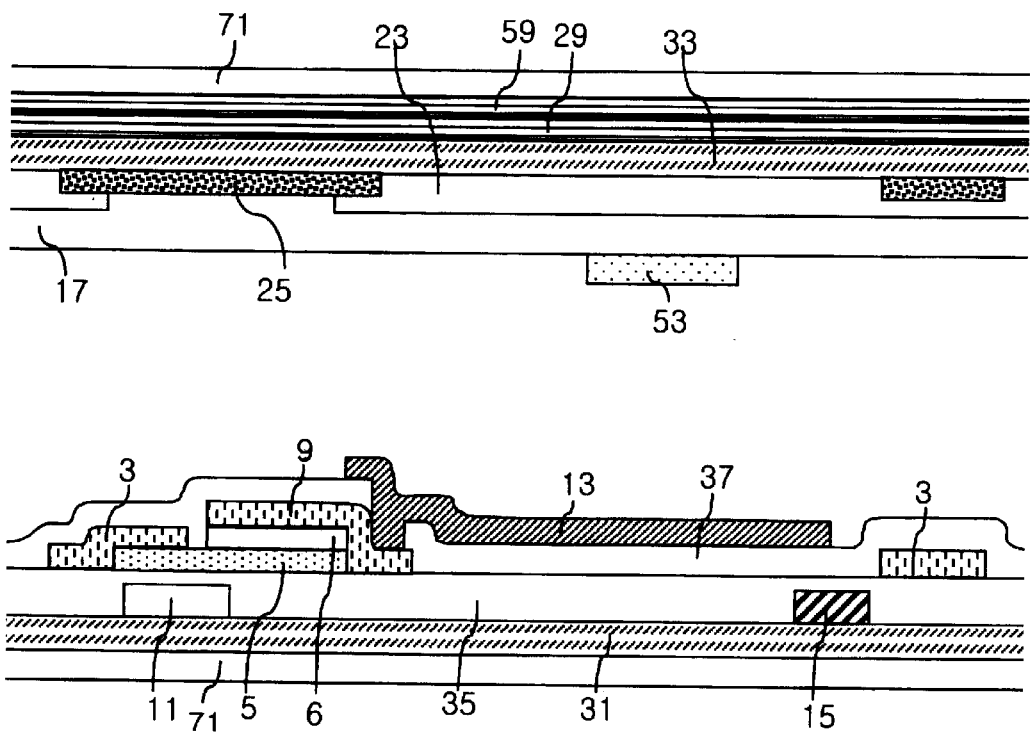
Figure 8D:
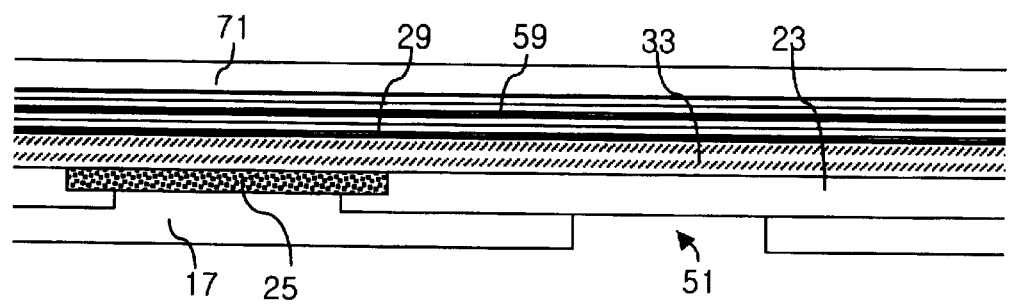
Figure 8D:
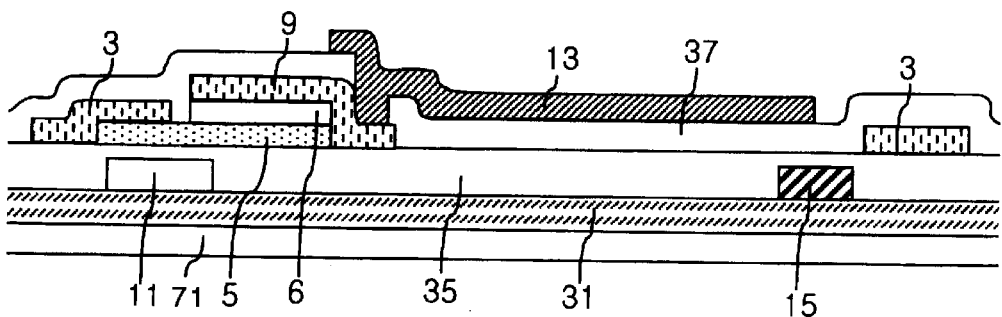
Figure 9A:
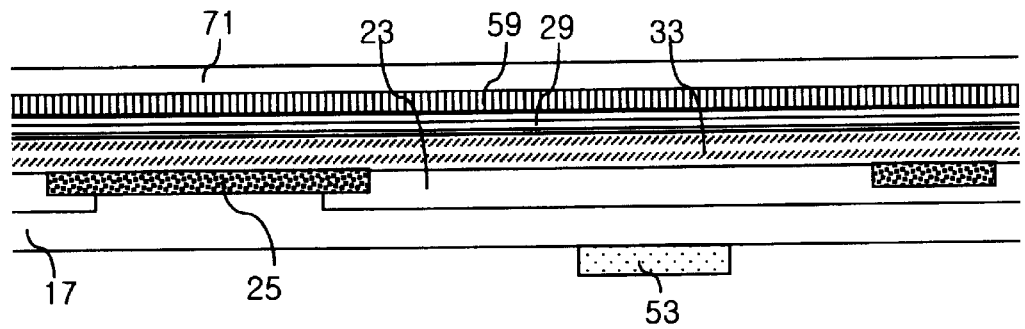
FIGS. 9A to 9D are sectional views taken along the line I–I' of FIG. 3A according to the embodiments of the present invention.
Figure 9A:
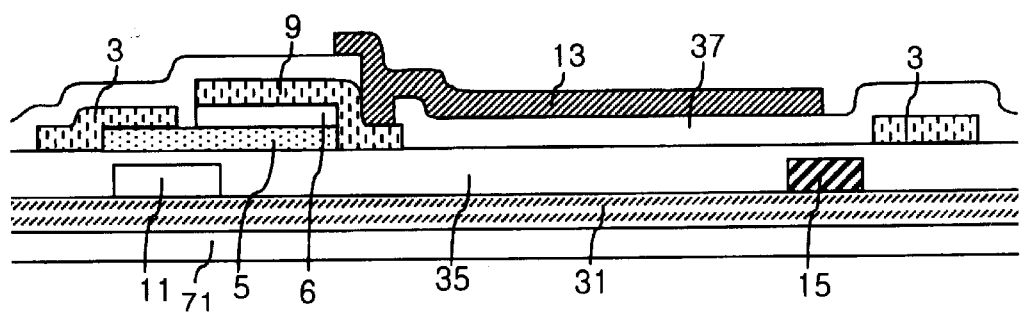
Figure 9B:
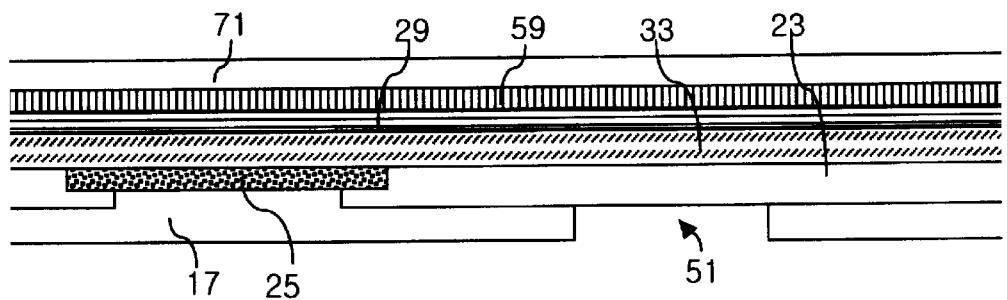
Figure 9B:
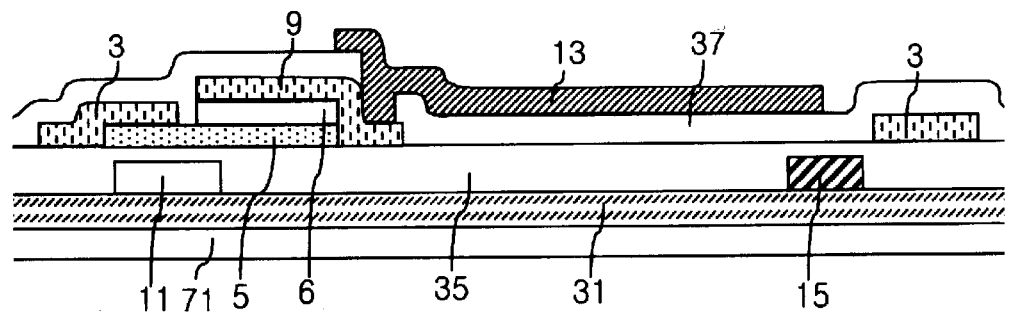
Figure 9C:
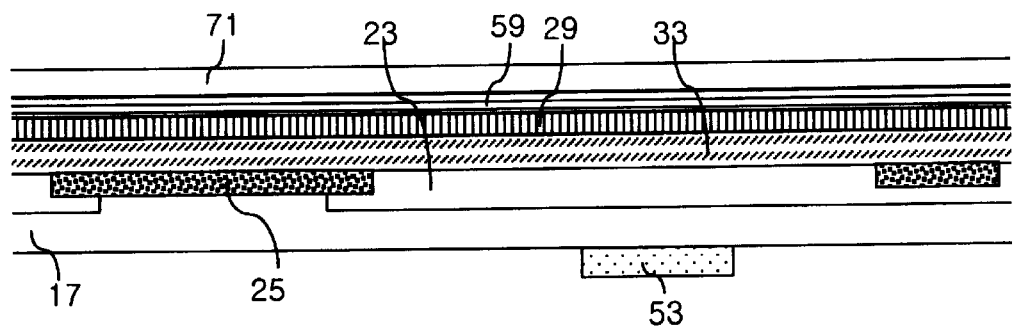
Figure 9C:
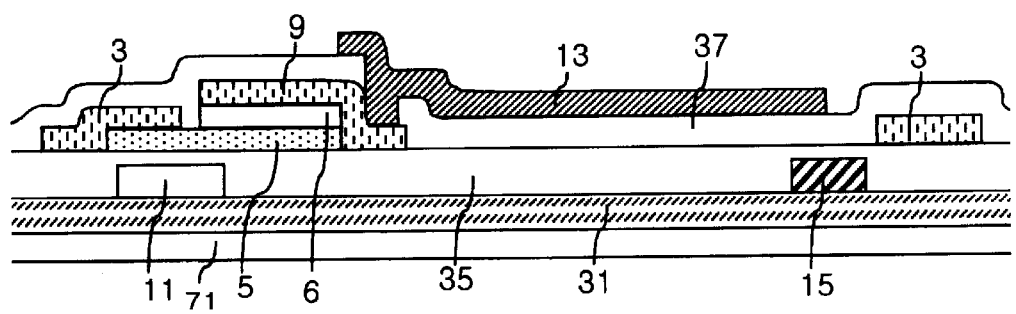
Figure 9D:
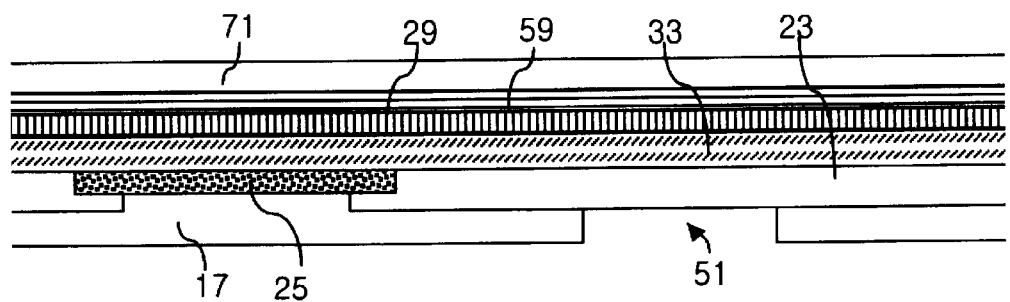
Figure 9D:
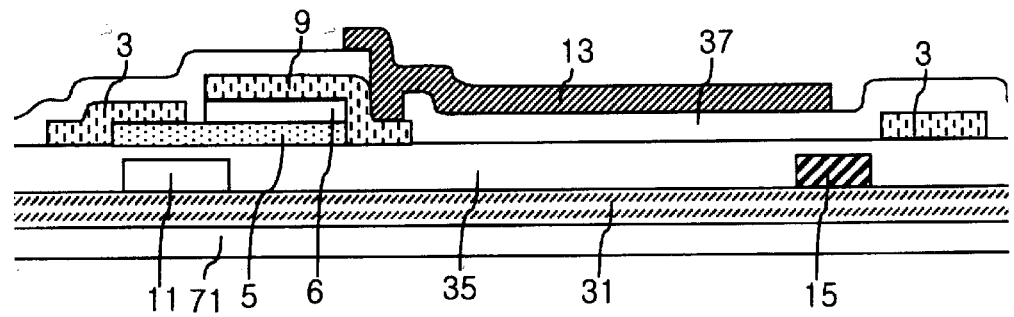

FIGS. 2A and 2C are plan views of the multi-domain liquid crystal display device according to the first embodiment of the present invention and FIGS. 2B and 2D are sectional views taken along the line II–II' of FIG. 2A and the line III–III'of FIG. 2C, FIGS. 3A and 3B are plan views of the multi-domain liquid crystal display device according to the second embodiment of the present invention, FIGS. 4A and 4B are plan views of the multi-domain liquid crystal display device according to the third embodiment of the present invention.

As shown in the figures, the present invention comprises first and second substrates 31, 33, a plurality of gate bus lines 1 arranged in a first direction on the first substrate and a plurality of data bus lines 3 arranged in a second direction on the first substrate, a common-auxiliary electrode 15, a TFT, a passivation layer 37, a pixel electrode 13, and a storage electrode 43.

Data bus lines 3 and gate bus lines 1 divide the first substrate 31 into a plurality of pixel regions. The common-auxiliary electrode 15 distorts electric field on a same layer whereon the gate bus line 1 is formed. The TFT is formed on each pixel region and comprises a gate electrode 11, a gate insulator 35, a semiconductor layer 5, an ohmic contact layer 6, and source/drain electrodes 7, 9.

Passivation layer 37 is formed overall first substrate 31. Pixel electrode 13 is coupled to the drain electrode 9 and has at least one series of windows inducing electric field 51 in a plurality of specified directions. A part of the pixel electrode 13 overlaps the common-auxiliary electrode 15. And, the storage electrode 43 is contacted to the pixel electrode 13 to overlap the gate bus line 1 (as shown in FIGS. 2A and 2C), to overlap the gate bus line 1 and the common auxiliary electrode 15 (as shown in FIGS. 3A and 3B), or to overlap the common auxiliary electrode 15 (as shown in FIGS. 4A and 4B).

On the second substrate 33, a light shielding layer 25 is formed to shield the light leaked from gate and data bus lines 1, 3, and the TFT, a color filter layer 23 is formed on the light shielding layer, a common electrode 17 is formed on the color filter layer, and a liquid crystal layer is formed between the first and second substrates 31, 33.

The common electrode 17 has dielectric frames 53 thereon, or has window inducing electric field 51 like hole or slit in its inner part. In FIG. 2C, 3B and 4B, the window 51 is formed on the common-auxiliary electrode 15 in order to stable the texture.

FIGS. 5A to 5E are views showing the forming process of the present multi-domain liquid crystal display device taken along the line I–I'of FIG. 3A, FIGS. 6A to 6D are sectional views taken along the line I–I' of FIG. 3A according to the embodiments of the present invention, FIGS. 7A to 7H are sectional views taken along the line I–I' of FIG. 3A according to the embodiments of the present invention, FIGS. 8A to 8D are sectional views taken along the line I–I' of FIG. 3A according to the embodiments of the present invention, FIGS. 9A to 9D are sectional views taken along the line I–I' of FIG. 3A according to the embodiments of the present invention.

To manufacture the multi-domain LCD of the present invention, in each pixel region on the first substrate 31, a TFT is formed comprising gate electrode 11, gate insulator 35, semiconductor layer 5, ohmic contact layer 6 and source/drain electrodes 7, 9. At this time, a plurality of gate bus lines 1 and a plurality of data bus lines 3 are formed to divide the first substrate 31 into a plurality of pixel regions.

Gate electrode 11 and gate bus line 1 are formed by sputtering and patterning a metal such as Al, Mo, Cr, Ta, or Al alloy, or the combination of these metals, etc. At this time, the common-auxiliary electrode 15 is formed on a verge of a pixel region on the first substrate 31 (as shown in FIGS. 2A, 3A and 4A), or the common auxiliary electrode 15 is formed on verge of the pixel region with a plurality of horizontal portions thereof, each overlaps the window inducing electric field in horizontal direction (as shown in FIGS. 2C, 3B and 4B). Also, The common-auxiliary electrode 15 has connecting parts which connect to the common-auxiliary electrode in a pixel region neighboring the pixel region.

(FIG. 5A)

When the common-auxiliary electrode 15 and the gate bus line 1 are formed with the same material, the common-auxiliary and gate electrodes are simultaneously formed with one mask and connected electrically to common electrode 17, or it is possible to form them with different materials or double layer with additional masks.

The gate insulator 35 is formed by depositing $SiN_X$ or $SiO_X$ using PECVD thereon.

The semiconductor layer 5 and the ohmic contact layer 6 are formed by depositing with PECVD(Plasma Enhanced Chemical Vapor Deposition), and patterning amorphous silicon (a-Si) and doped amorphous silicon ($n^+$ a-Si), respectively. Also, gate insulator 35, amorphous silicon (a-Si), and doped amorphous silicon ($n^+$ a-Si) are formed by PECVD and patterned.

(FIG. 5B)

Data bus line 3 and source/drain electrodes 7, 9 are formed by sputtering and patterning a metal such as Al, Mo, Cr, Ta, or Al alloy, or the combination of these metals, etc.

A storage electrode 43 is formed to overlap the gate bus line 1, the gate bus line 1 and the common auxiliary electrode 15,or common-auxiliary electrode 15 at the same time, the storage electrode 43 makes a storage capacitance with gate bus line 1 and/or common-auxiliary electrode 15.

(FIG. 5C)

Subsequently, passivation layer 37 is formed with BCB (BenzoCycloButene), acrylic resin, polyimide based material, $SiN_X$ or $SiO_X$ overall first substrate 31. (FIG. 5D) Pixel electrode 13 is formed by sputtering and patterning a metal such as ITO (indium tin oxide). In case of use the BCB, acrylic resin, polyimide based material on the passivation layer, the aperture ratio could be increased because of overlapping the data bus lines.

A contact hole 39 is formed to connect the pixel electrode 13 to the drain and storage electrodes by opening and patterning a part of the passivation layer 37 on the drain electrode. (FIG. 5E) Also, the gate insulator 35 is formed with BCB, acrylic resin, polyimide based material in order to improve aperture ratio.

Pixel electrode 13 has at least one series of windows inducing electric field 51 in a plurality of specified directions and the longitudinal axis of the window inducing electric field 51 has 45 degrees or 135 degrees against the gate bus line 1.

The window inducing electric field 51 supports the electric field generated by the common-auxiliary electrode 15, which decreases the response time of the LCDs by 10–20 msec. In addition, a part of the pixel electrode 13 overlaps the common-auxiliary electrode 15, so that the storage capacitance is widened, the ununiform intensity of the electric field is controlled, and the disclination is removed.

On the second substrate 33, a light shielding layer 25 is formed to shield any light leakage from the gate and data bus lines 1, 3, the TFT, and the common-auxiliary electrode 15. A color filter layer 23 is formed R, G, B (red, green, blue) elements to alternate on the light shielding layer 25. A common electrode 17 is formed with ITO on the color filter layer 23, and a liquid crystal layer is formed by injecting liquid crystal between the first and second substrates 31, 33.

The liquid crystal layer may include liquid crystal molecules having positive or negative dielectric anisotropy. Also, the liquid crystal layer may include chiral dopants.

On the common electrode 17, dielectric frames 53 are formed by depositing photosensitive material and patterning in various shapes using photolithography. The dielectric frame 53 includes material of which dielectric constant is same or smaller than that of the liquid crystal, and the dielectric constant thereof is preferably below 3, for example, photoacrylate or BCB (BenzoCycloButene).

Furthermore, the dielectric frame 53 is formed on at least one substrate between the first and second substrates. And, a window inducing electric field 51 is formed on at least one substrate between the first and second substrates.

At this time, the dielectric frame and the window inducing electric field are formed on same substrate together. The window inducing electric field 51 is formed by patterning hole or slit in the common electrode 17 or pixel electrode 13.

To apply voltage ($V_{com}$) to the common-auxiliary electrode 15, Ag-dotting part is formed in each corner of driving area on first substrate 31, electric field is applied with second substrate 33, and the liquid crystal molecules are driven by the potential different. A voltage ($V_{com}$) is applied to the common-auxiliary electrode 15 by connecting the Ag-dotting part to the common-auxiliary electrode, which is accomplished simultaneously by forming the common-auxiliary electrode.

On at least one substrate, a compensation film 29 is formed with polymer. The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

Furthermore, it is possible to form a structure of first and second compensation films 29, 59. In the above structure, it uses the differences of specific refractive index of the film composition materials without performing the cross elongation, so that it could obtain uniform retardation (Δnd) rather than one film.

The LCDs in FIGS. 6A to 6D, uniaxial film ($n_x=n_y>n_z$ or $n_x>n_y=n_z$) or biaxial film ($n_x=n_z>n_x=n_y$) is formed on the second substrate 33, the LCDs in FIGS. 7A to 7H, uniaxial film ($n_x=n_y>n_z$ or $n_z>n_y=n_z$) or biaxial film ($n_x=n_z>n_x=n_y$) is formed on the first and second substrates 31, 33.

The LCDs in FIGS. 8A to 8D, two uniaxial films ($n_x=n_y>n_z$ or $n_x>n_y=n_z$) or two biaxial films ($n_x=n_z>n_x=n_y$) are formed on the second substrate 33, the LCDs in FIGS. 9A to 9D, uniaxial film ($n_x=n_y>n_z$ or $n_x>n_y=n_z$) and biaxial film ($n_x=n_z>n_x=n_y$) are formed on the second substrate 33.

After forming the compensation film, polarizer 71 is formed on at least one substrate. At this time, the compensation film and polarizer are preferably composed as one.

FIGS. 10A to 10E are simulations showing the gray inversion according to the retardation of compensation film of the present invention, FIGS. 11A to 11E are simulations showing the contrast ratio according to the retardation of compensation film of the present invention, FIGS. 12A to 12E are simulations showing the color shift according to the retardation of compensation film of the present invention.

The simulations represent the multi-domain liquid crystal display device of the present invention using the liquid crystal layer including chiral dopants and employing the above compensation film. The retardation of the liquid crystal layer is 0.42 μm, and in case of the liquid crystal having no chiral dopants, the retardation of the liquid crystal layer is preferably 0.31–0.32 μm.

Figure 10A:
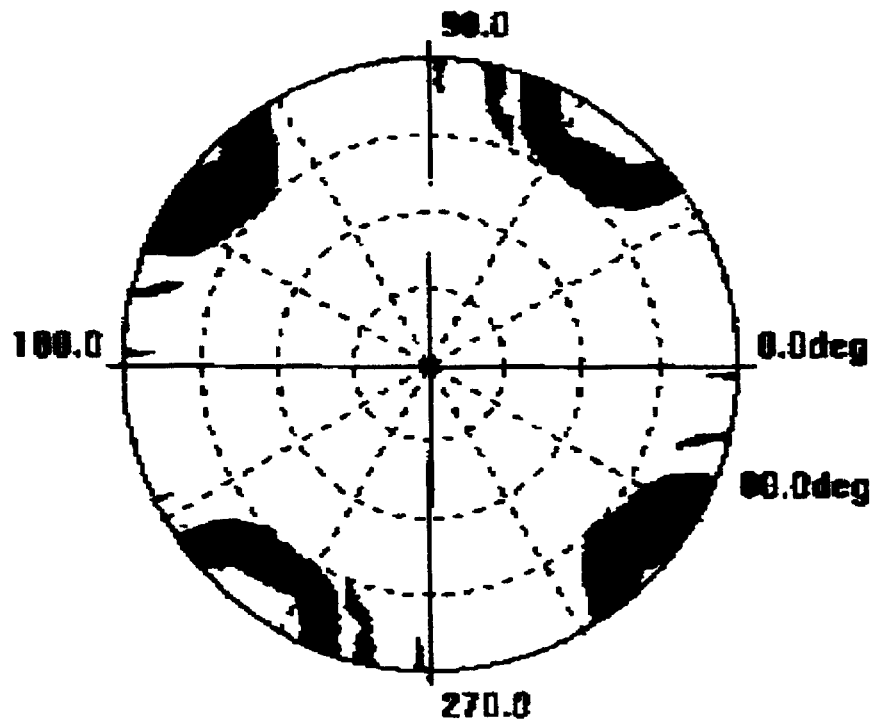
FIGS. 10A to 10E are simulations showing the gray inversion according to the retardation of compensation film of the present invention.
Figure 10B:
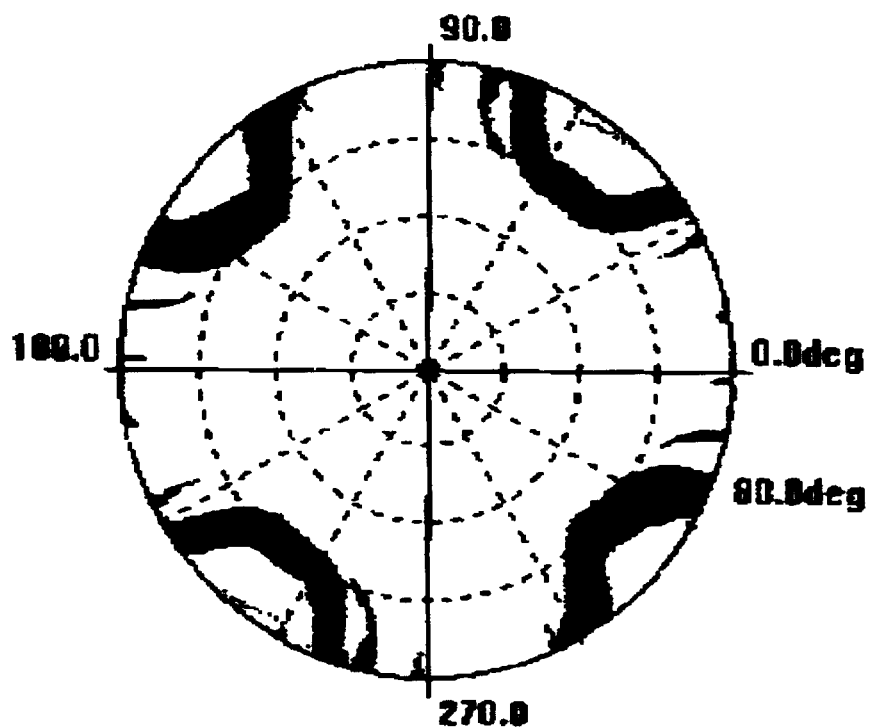
Figure 10C:
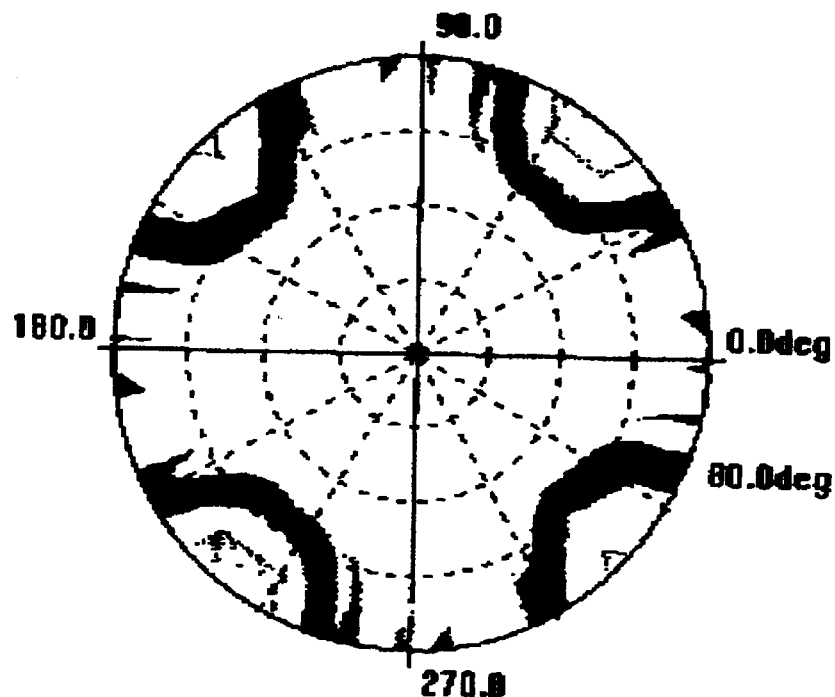
Figure 10D:
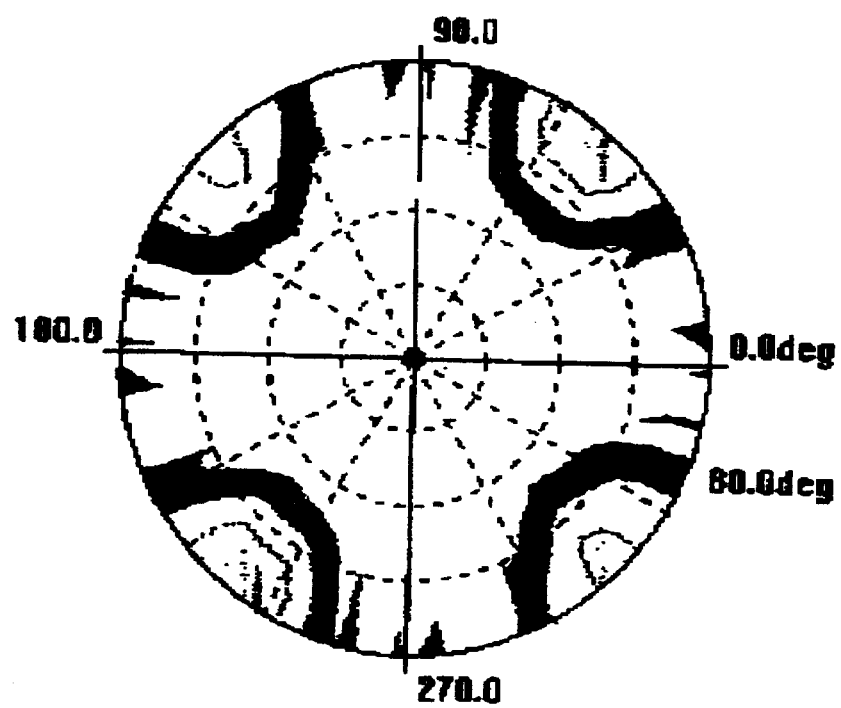
Figure 10E:
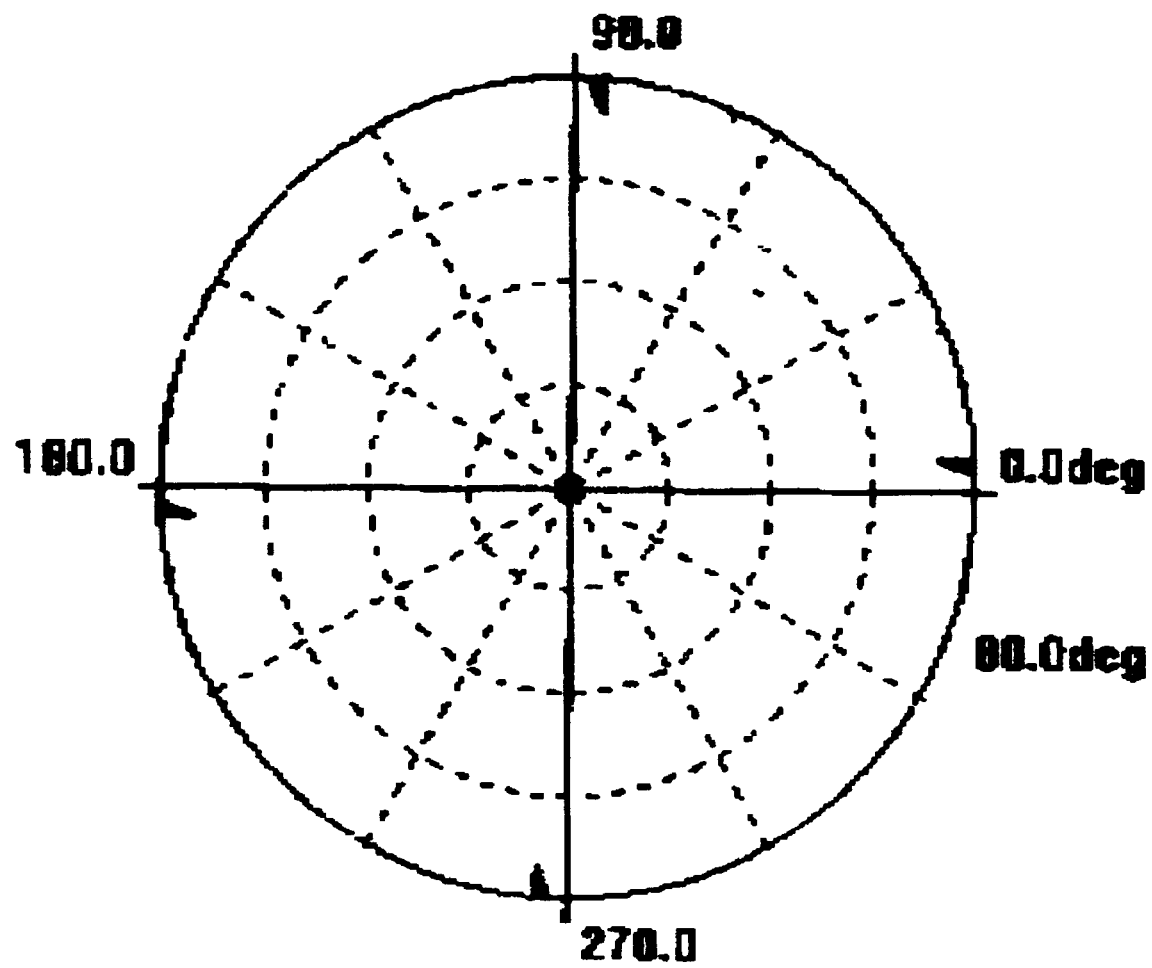
Figure 11A:
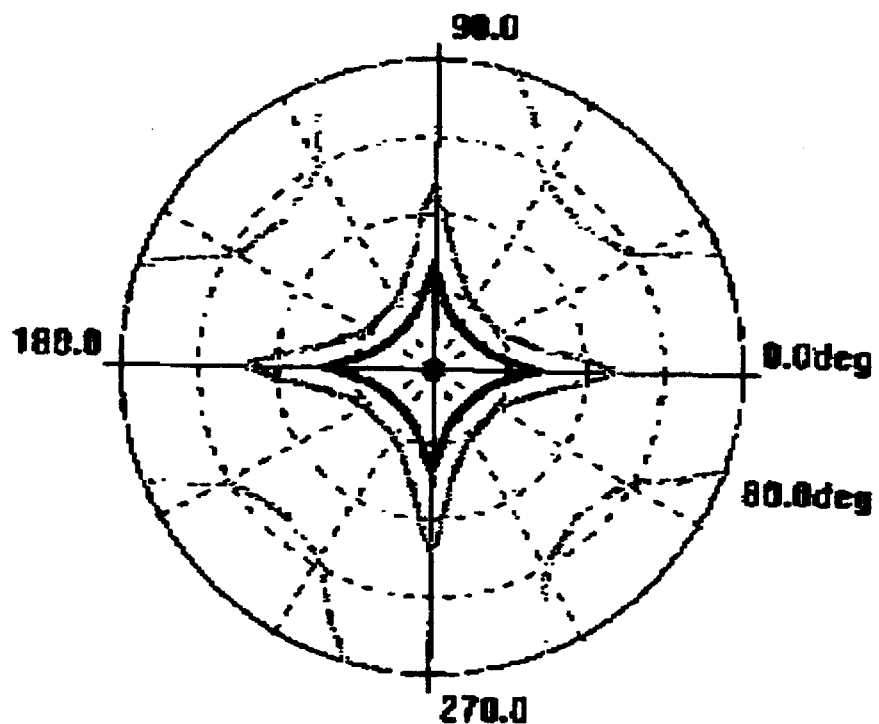
FIGS. 11A to 11E are simulations showing the contrast ratio according to the retardation of compensation film of the present invention.
Figure 11B:
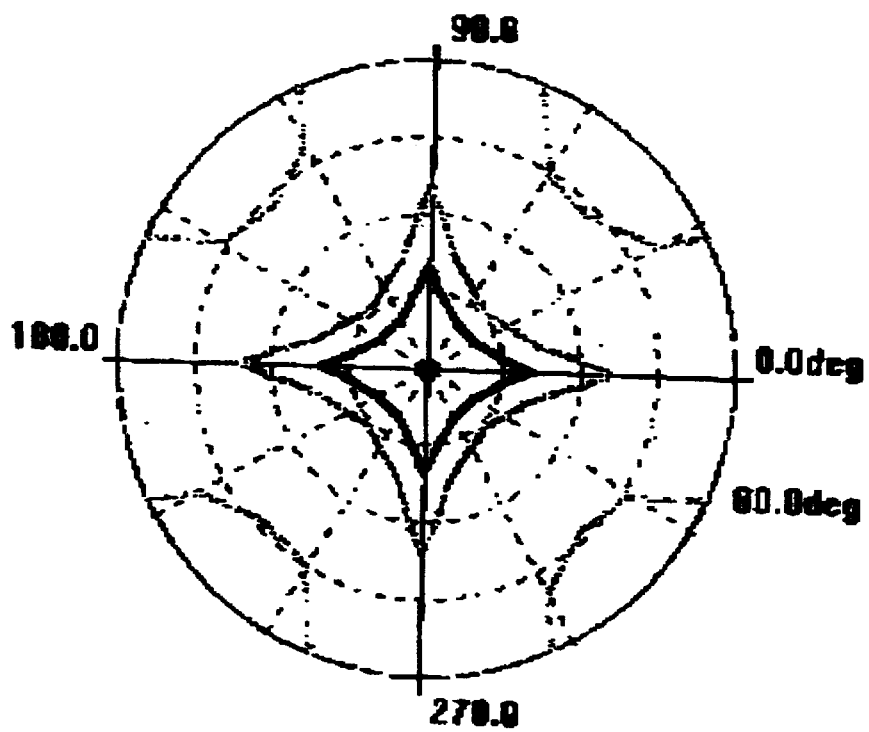
Figure 11C:
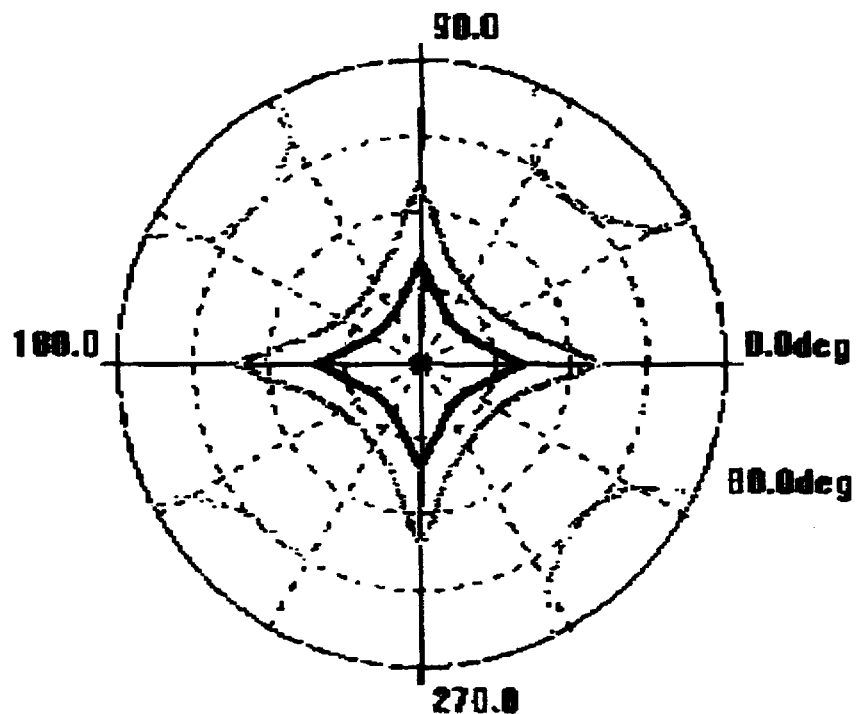
Figure 11D:
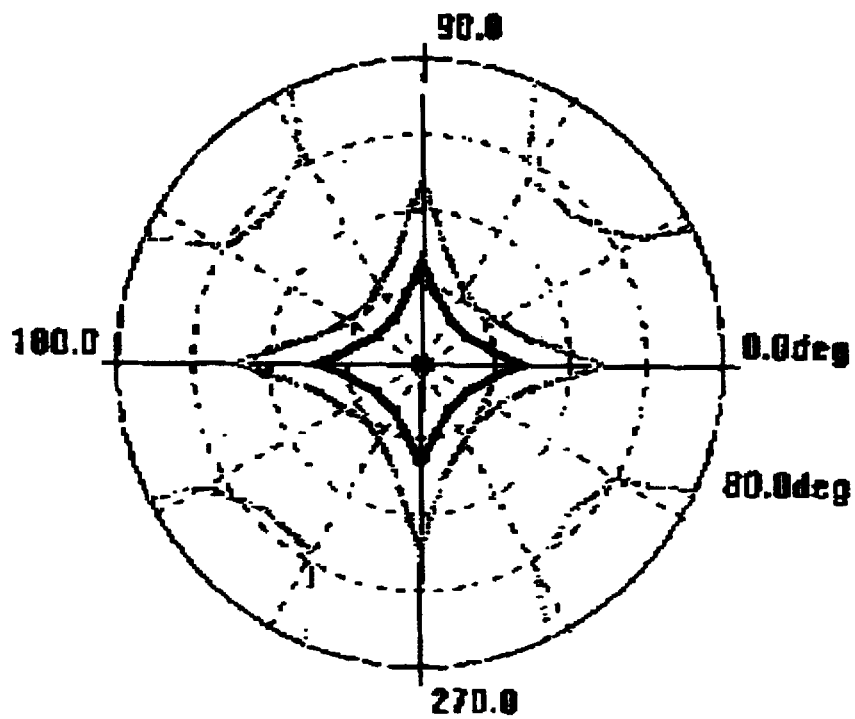
Figure 11E:
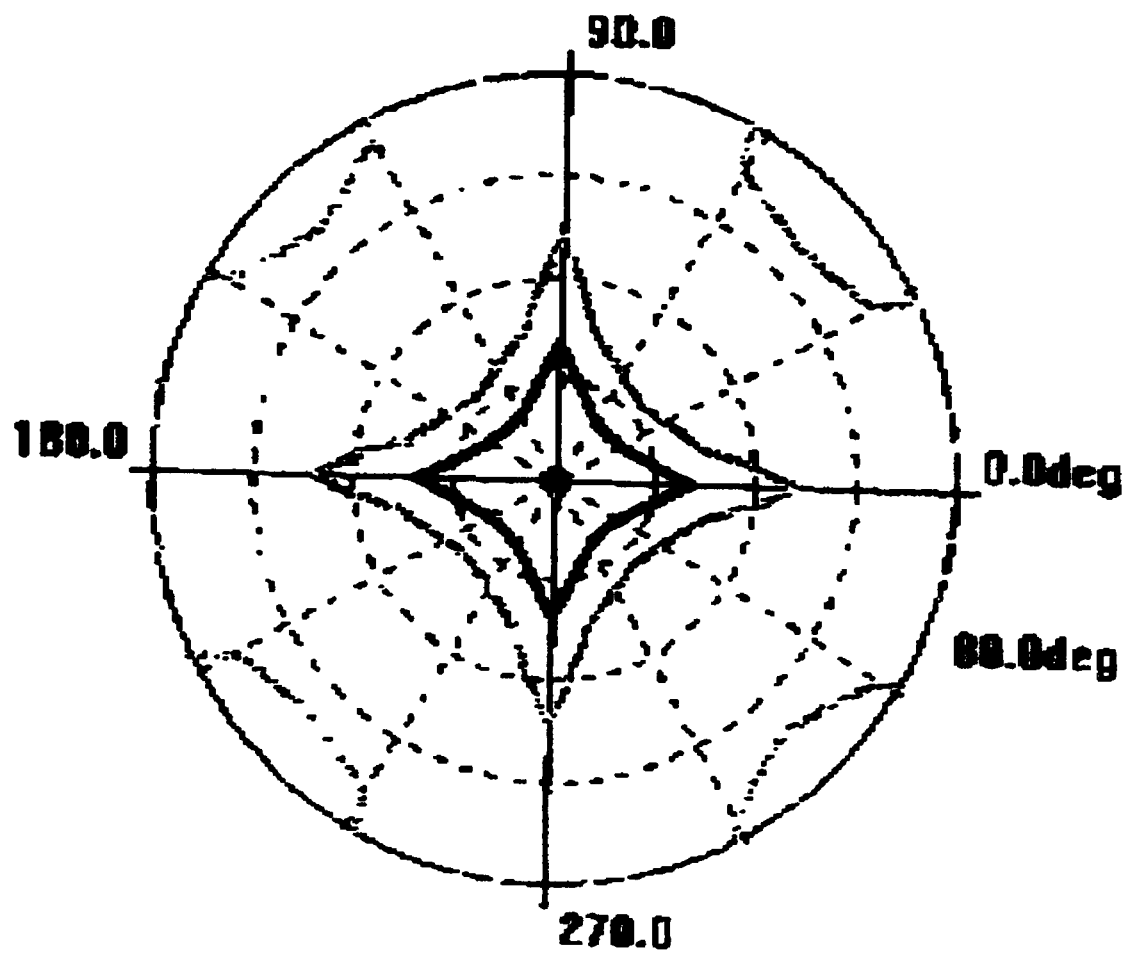
Figure 12A:
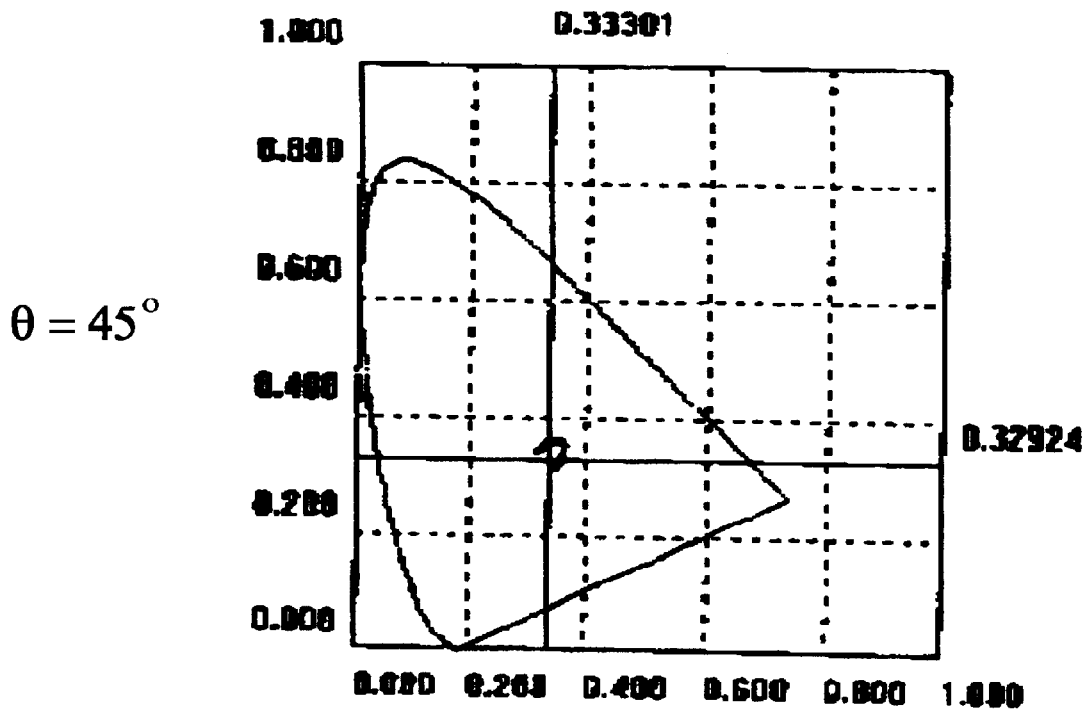
FIGS. 12A to 12E are simulations showing the color shift according to the retardation of compensation film of the present invention.
Figure 12A:
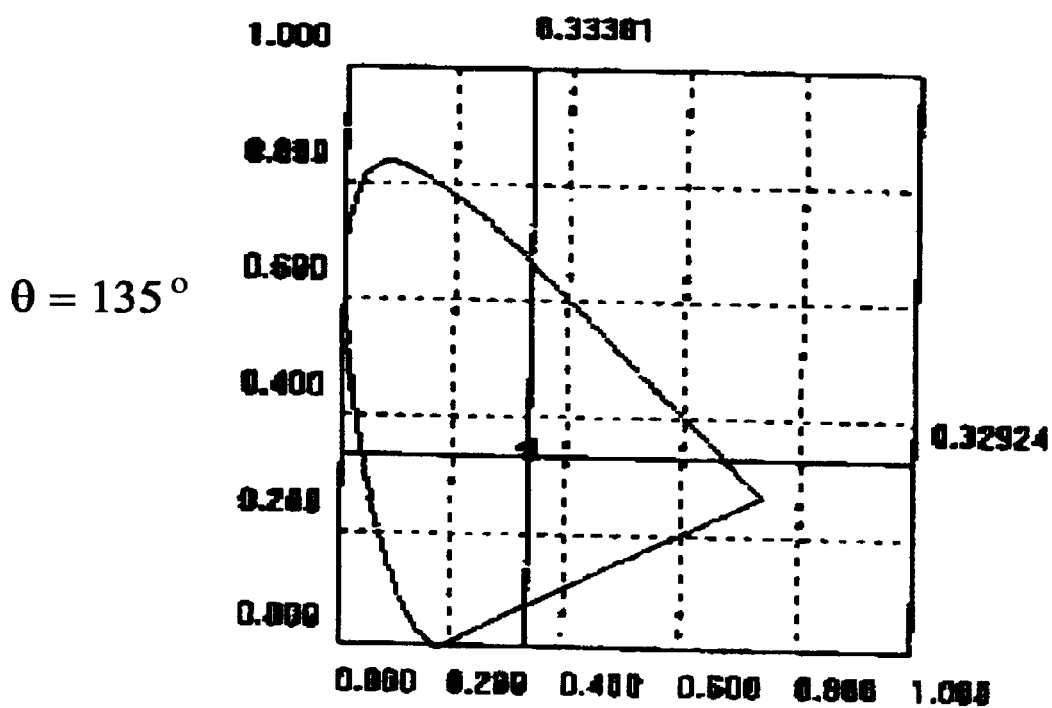
Figure 12B:
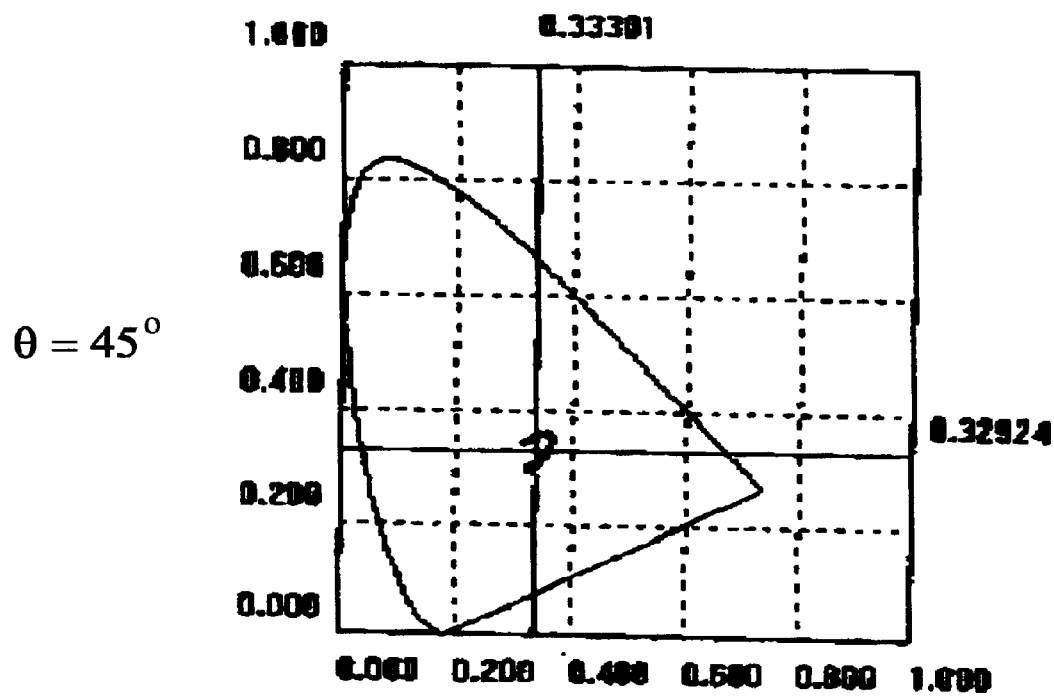
Figure 12B:
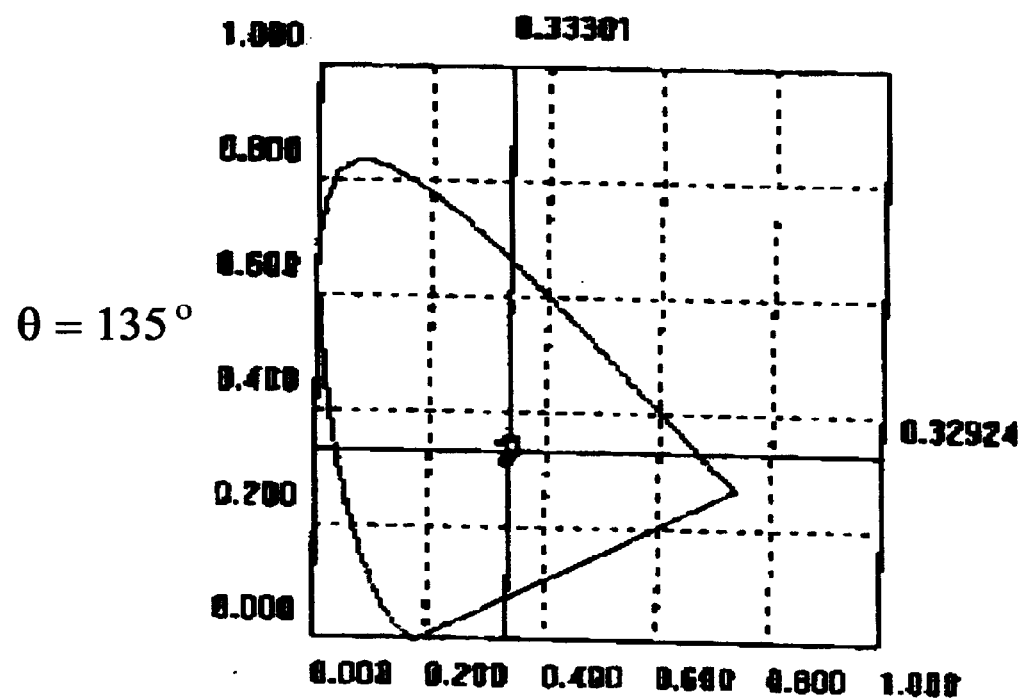
Figure 12C:
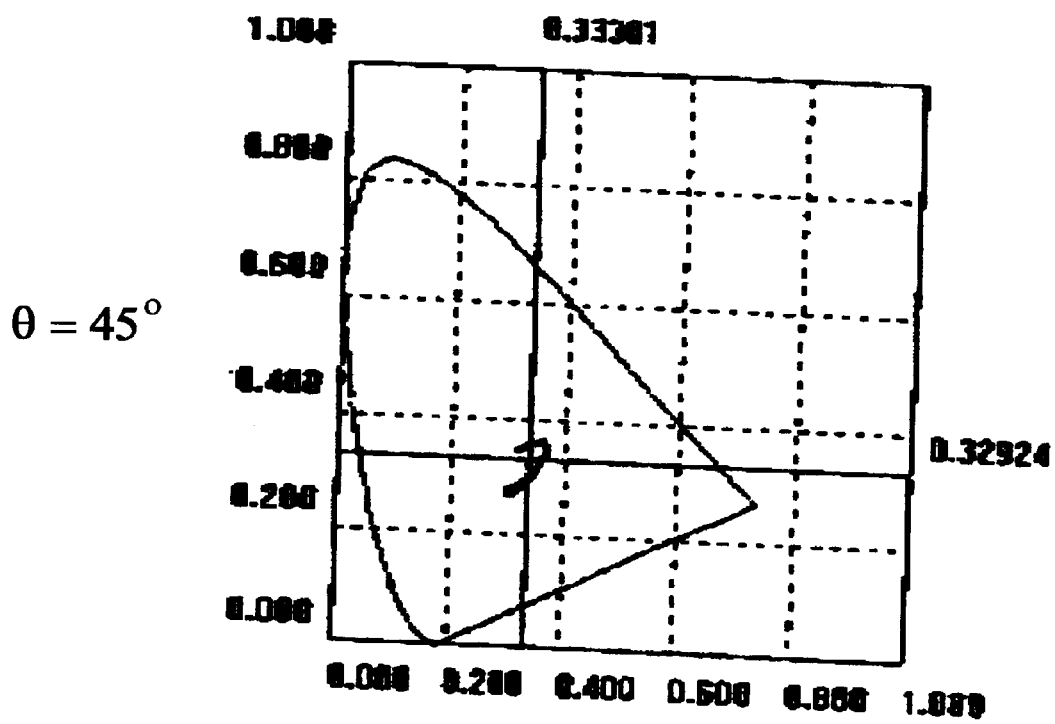
Figure 12C:
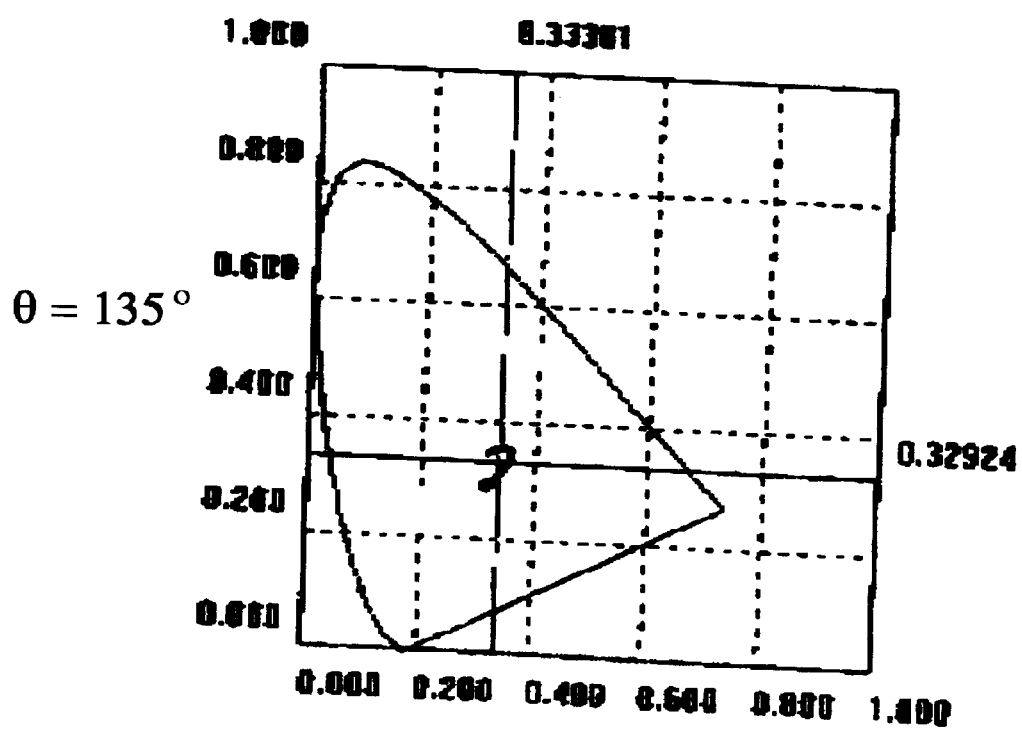
Figure 12D:
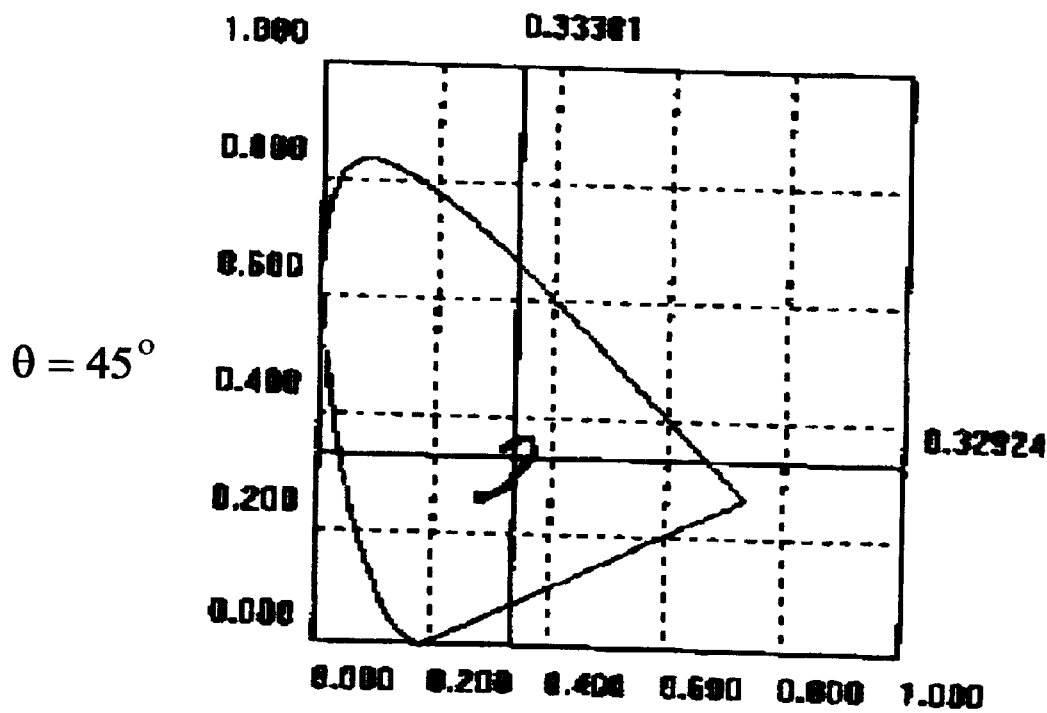
Figure 12D:
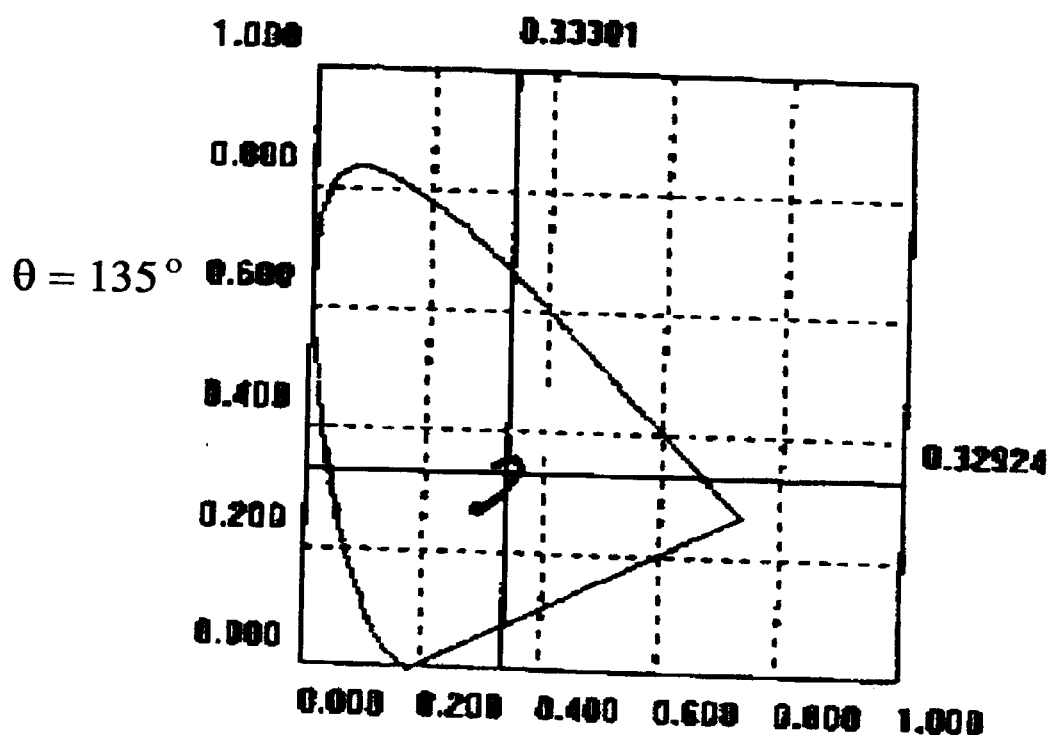
Figure 12E:
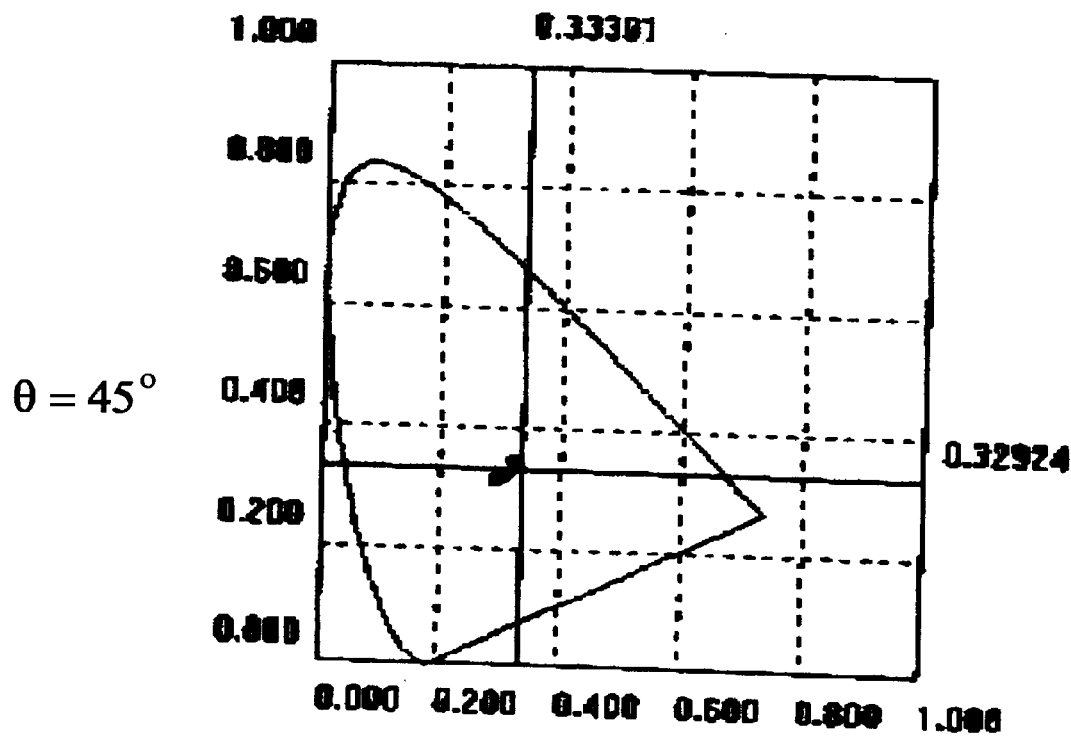
Figure 12E:
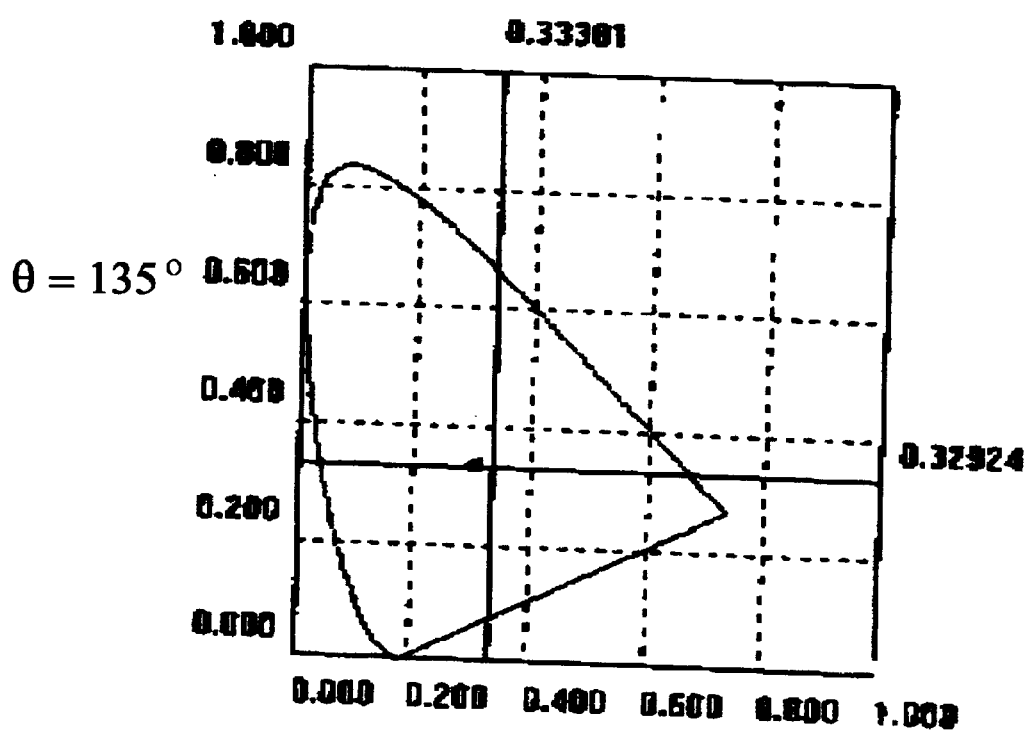

The retardation of the compensation film in FIGS. 10A, 11A, 12A is 320 nm, the retardation of the compensation film in FIGS. 10B, 11B, 12B is 370 nm, the retardation of the compensation film in FIGS. 10C, 11C, 12C is 420 nm, the retardation of the compensation film in FIGS. 10D, 11D, 12D is 470 nm, the retardation of the compensation film in FIGS. 10E, 11E, 12E is 210+210 nm.

Also, FIGS. 6A, 6C, 7A, 7C, 7E, 7G, 8A, 8C, 9A, 9C show that dielectric frame 53 is formed on the common electrode 17, and FIGS. 6B, 6D, 7B, 7D, 7F, 7H, 8B, 8D, 9B, 9D show that window inducing electric field 51 is formed in the common electrode 17.

In the multi-domain LCD of the present invention, the aperture ratio is enhanced by an optimum structure design of a "n-line" thin film transistor (U.S. Pat. No. 5,694,185) so as to reduce power consumption, increase luminance, and lower reflection, thus improving contrast ratio.

Aperture ratio is increased by forming the TFT above the gate line and providing a "n-line" TFT. The parasitic capacitor, occurring between the gate bus line and the drain electrode, can be reduced when a TFT having the same channel length as the symmetrical TFT structure is manufactured due to effect of channel length extension.

The multi-domain LCD of the present invention has a dielectric frame 53 on the pixel electrode, common electrode, and/or color filter layer, or an window inducing electric field 51 like a hole or slit in the pixel electrode, passivation layer, gate insulator, color filter layer, and/or common electrode by patterning, thereby electric field distortion effect and multi-domain are obtained.

That is, from forming window inducing electric field 51 or dielectric frame 53, the multi-domain is obtained by dividing each pixel into four domains such as in a "+", "x", or "double Y" shape, or dividing each pixel horizontally, vertically, and/or diagonally, and differently alignment-treating or forming alignment directions on each domain and on each substrate.

Furthermore, in multi-domain LCD of the present invention, an alignment layer(not shown in the figure) is formed over the whole first and/or second substrates. The alignment layer includes a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle.

The light used in the photo-alignment is preferably a light in a range of ultraviolet light, and any of unpolarized light, linearly polarized light, and partially polarized light can be used.

In the photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a "+" or "x" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Consequently, since the multi-domain LCD of the present invention forms the gate electrode and the common-auxiliary electrode on the same layer, and windows inducing electric field in the pixel electrode, it is easy to control the alignment directions in domains, which obtains wide viewing angle and multi-domain effect. Moreover, the short between the pixel and common-auxiliary electrodes is removed, and then the yield is improved.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:

first and second substrates facing each other;

a plurality of gate bus lines arranged in a first direction on the first substrate and a plurality of data bus lines arranged in a second direction on the first substrate to define a pixel region;

a thin film transistor at a crossing area of the gate and data bus lines;

a common-auxiliary electrode on a verge of the pixel region;

a pixel electrode in the each pixel region, the pixel electrode connecting the thin film transistor;

at least one series of electric field inducing windows in a plurality of specified directions in the pixel electrode;

an alignment layer on at least one substrate between the first and second substrates;

a dielectric frame for distorting electric field on the second substrate; and a liquid crystal layer between the first and second substrates.

2. The multi-domain liquid crystal display device according to claim 1, wherein an angle between the longitudinal axis of the electric field inducing window and the first direction is 45 degrees or 135 degrees.

3. The multi-domain liquid crystal display device according to claim 1, wherein the common-auxiliary electrode has connecting parts which connect to a common-auxiliary electrode in a pixel region neighboring the pixel region in the first direction.

4. The multi-domain liquid crystal display device according to claim 1, wherein a part of the pixel electrode overlaps the common-auxiliary electrode.

5. The multi-domain liquid crystal display device according to claim 4, wherein the electric field inducing window is formed on the common-auxiliary electrode.

6. The multi-domain liquid crystal display device according to claim 1, wherein the longitudinal axis of the dielectric frame for distorting electric field is parallel with the longitudinal axis of the electric field inducing window.

7. The multi-domain liquid crystal display device according to claim 1, further comprising:

a first compensation film on the first or second substrate.

8. The multi-domain liquid crystal display device according to claim 7, further comprising:

a second compensation film on the first compensation film.

9. The multi-domain liquid crystal display device according to claim 1, wherein the pixel region is divided into at least two portions, liquid crystal molecules in the liquid crystal layer in each portion being driven differently from each other.

10. The multi-domain liquid crystal display device according to claim 1, wherein the common auxiliary electrode is formed on a verge of the pixel region with a plurality of portions thereof extended to the first direction.

11. The multi-domain liquid crystal display device according to claim 10, wherein the plurality of portions are overlapped with the electric field inducing windows in the first direction.

12. The multi-domain liquid crystal display device according to claim 1, further comprising:

a storage electrode connected to the pixel electrode to overlap the gate bus line.

13. The multi-domain liquid crystal display device according to claim 1, further comprising:

a storage electrode connected to the pixel electrode to overlap the gate bus line and the common auxiliary electrode.

14. The multi-domain liquid crystal display device according to claim 1, further comprising:

a storage electrode connected to the pixel electrode to overlap the common auxiliary electrode.

* * * * *